US010460214B2

(12) United States Patent
Lu et al.

(10) Patent No.: US 10,460,214 B2
(45) Date of Patent: Oct. 29, 2019

(54) DEEP SALIENT CONTENT NEURAL NETWORKS FOR EFFICIENT DIGITAL OBJECT SEGMENTATION

(71) Applicant: Adobe Inc., San Jose, CA (US)

(72) Inventors: Xin Lu, Mountain View, CA (US); Zhe Lin, Fremont, CA (US); Xiaohui Shen, San Jose, CA (US); Jimei Yang, Merced, CA (US); Jianming Zhang, Campbell, CA (US); Jen-Chan Jeff Chien, Saratoga, CA (US); Chenxi Liu, Baltimore, MD (US)

(73) Assignee: Adobe Inc., San Jose, CA (US)

( * ) Notice: Subject to any disclaimer, the term of this patent is extended or adjusted under 35 U.S.C. 154(b) by 73 days.

(21) Appl. No.: 15/799,395

(22) Filed: Oct. 31, 2017

(65) Prior Publication Data

US 2019/0130229 A1    May 2, 2019

(51) Int. Cl.
*G06K 9/66* (2006.01)
*G06K 9/46* (2006.01)
*G06T 7/194* (2017.01)

(52) U.S. Cl.
CPC ............ *G06K 9/66* (2013.01); *G06K 9/4628* (2013.01); *G06K 9/4671* (2013.01); *G06T 7/194* (2017.01); *G06T 2207/20081* (2013.01); *G06T 2207/20084* (2013.01)

(58) Field of Classification Search
CPC ...... G06K 9/66; G06K 9/4628; G06K 9/4671; G06T 7/194
See application file for complete search history.

(56) References Cited

U.S. PATENT DOCUMENTS

2017/0169313 A1    6/2017  Choi et al.
2017/0244908 A1*   8/2017  Flack ................. G06K 9/00234

OTHER PUBLICATIONS

Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).*

(Continued)

*Primary Examiner* — David F Dunphy
(74) *Attorney, Agent, or Firm* — Keller Jolley Preece

(57) ABSTRACT

Systems, methods, and non-transitory computer-readable media are disclosed for segmenting objects in digital visual media utilizing one or more salient content neural networks. In particular, in one or more embodiments, the disclosed systems and methods train one or more salient content neural networks to efficiently identify foreground pixels in digital visual media. Moreover, in one or more embodiments, the disclosed systems and methods provide a trained salient content neural network to a mobile device, allowing the mobile device to directly select salient objects in digital visual media utilizing a trained neural network. Furthermore, in one or more embodiments, the disclosed systems and methods train and provide multiple salient content neural networks, such that mobile devices can identify objects in real-time digital visual media feeds (utilizing a first salient content neural network) and identify objects in static digital images (utilizing a second salient content neural network).

20 Claims, 15 Drawing Sheets

(56) References Cited

OTHER PUBLICATIONS

Everingham, M. and VanGool, L. and Williams, C. K. I. and Winn, J. and Zisserman, A.; "The PASCAL Visual Object Classes Challenge 2007," (VOC2007) Results, Nov. 8, 2007, available at http://host.robots.ox.ac.uk/pascal/VOC/voc2007/.

Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.

L.C. Chen, G. Papandreou, I. Kokkinos, K. Murphy, and A.L. Yuille; "Semantic image segmentation with deep convolutional nets and fully connected crfs," In ICLR, 2015.

K.M. He, X. Y. Zhang, S.Q. Ren, and J. Sun; "Deep residual learning for image recognition," In arXiv:1409.1556v6, 2016.

Gao Huang, Zhuang Liu, Kilian Q. Weinberger, and Laurens V.D. Maaten; "Densely connected convolutional networks," In arXiv:1608.06993v3, 2016.

J. Long, E. Shelhamer, and T. Darrell; "Fully convolutional networks for semantic segmentation," In CVPR , pp. 1-9, 2015.

C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.

Combined Search & Examination Report as received in GB1813276.1 dated Feb. 14, 2019.

Control Theory and Informatics, vol. 2, No. 1, 2012 Digital Image Processing for Camera Application in Mobile Devices using Artificial Neural Networks, Kamat, S. P., pp. 11-17.

\* cited by examiner

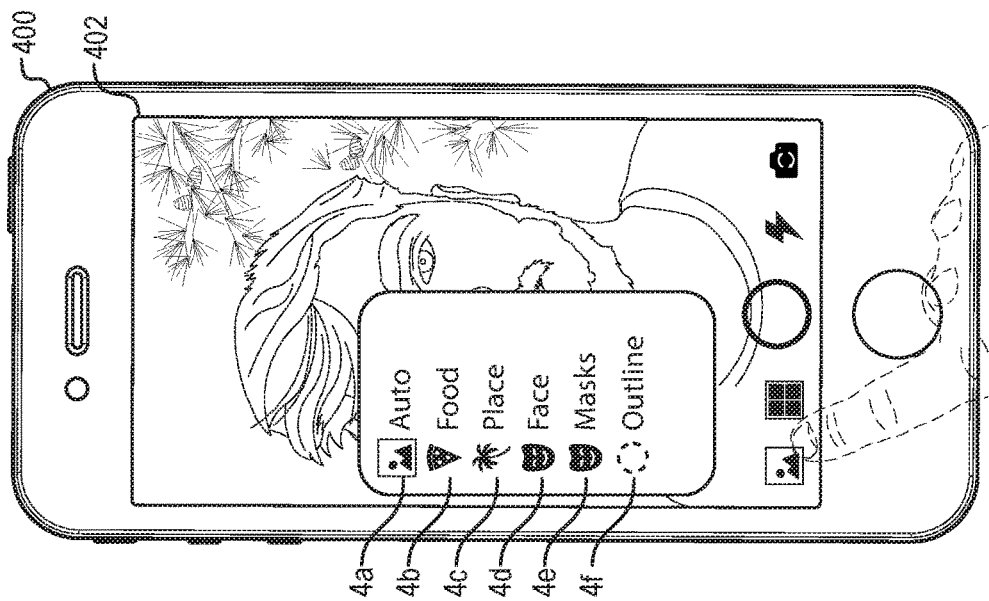
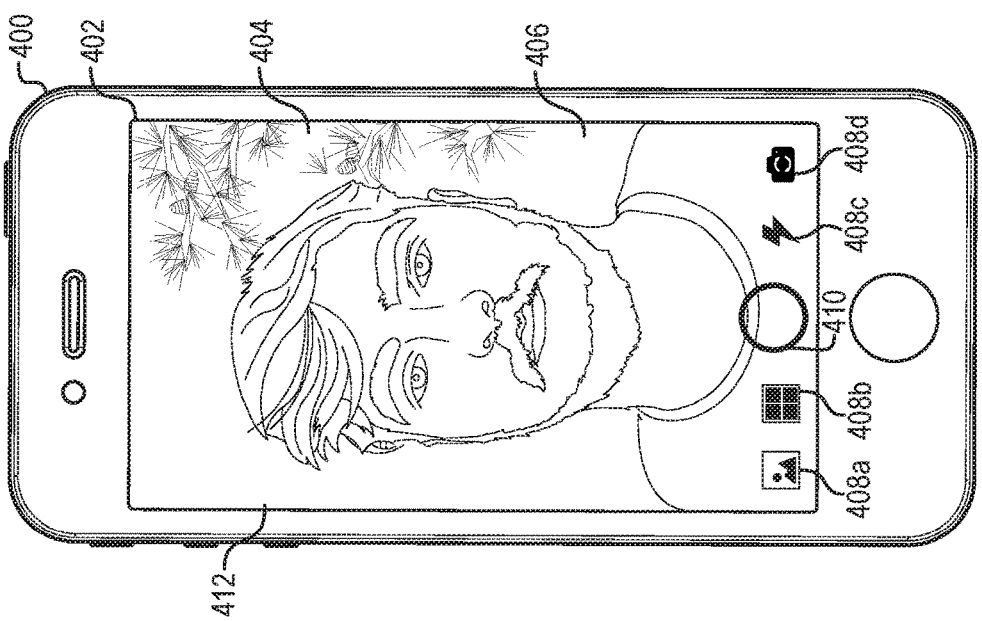

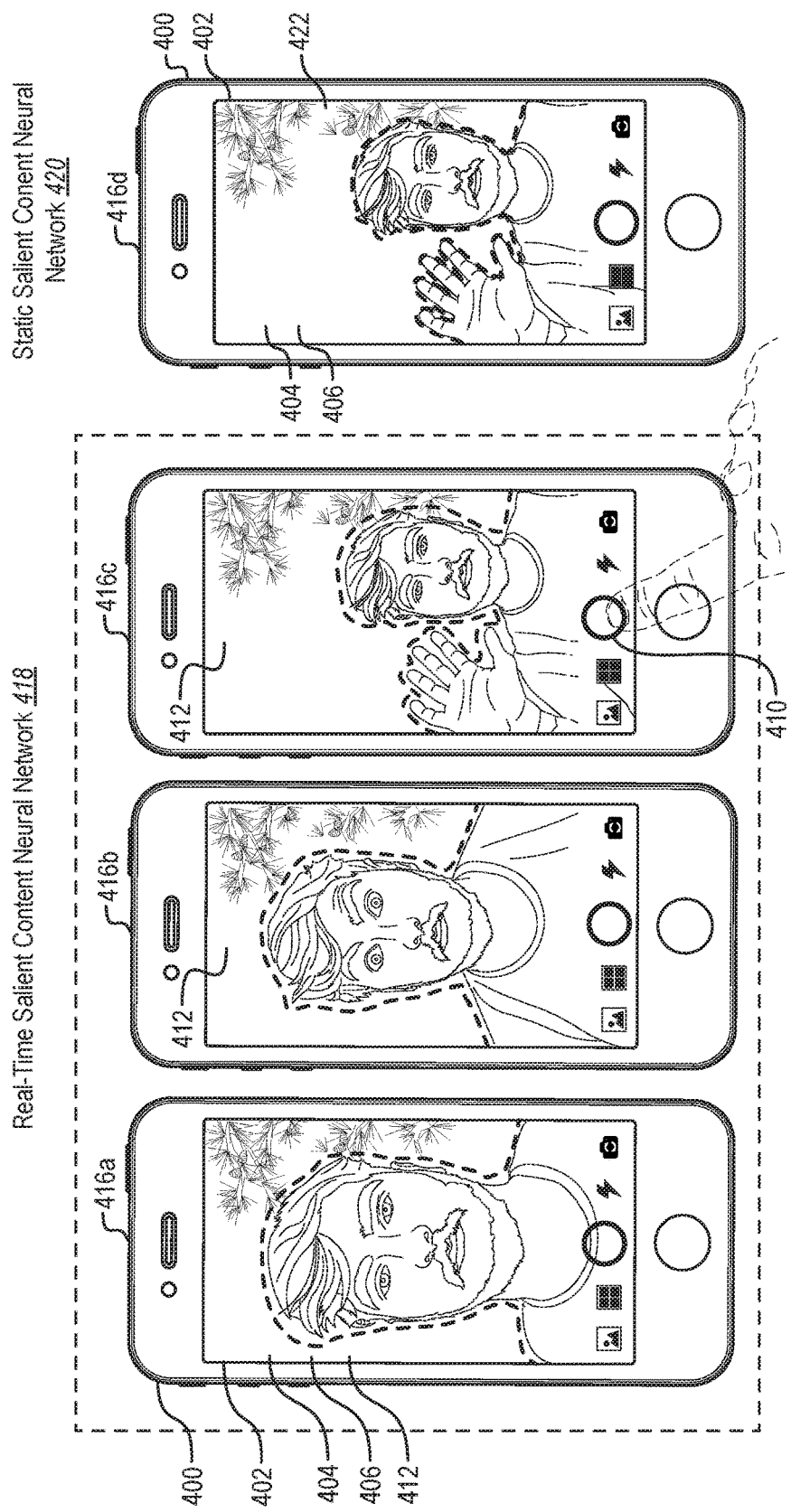

DEEP SALIENT CONTENT NEURAL NETWORKS FOR EFFICIENT DIGITAL OBJECT SEGMENTATION

BACKGROUND

Recent years have seen a precipitous rise in the use of digital visual media on client computing devices. Indeed, individuals and businesses increasingly utilize laptops, tablets, smartphones, handheld devices, and other mobile technology for a variety of tasks involving digital visual media. For example, individuals and businesses increasingly utilize smartphones to capture, view, and modify digital visual media such as portrait images, "selfies," or digital videos.

Although conventional digital visual media systems allow users to capture and modify digital visual media, they also have a number of significant shortcomings. For example, conventional digital visual media systems can utilize cameras to capture digital visual media, but cannot easily, quickly, or efficiently select or segregate individual objects from other pixels portrayed in the digital visual media.

Some conventional digital visual media systems assist users in segregating an object portrayed in a digital image by manually tracing a boundary line around the individual. Conventional systems that rely on manual tracing, however, have significant drawbacks in terms of accuracy, speed, and efficiency. Indeed, applying such conventional systems generally requires a significant amount of time and still result in inaccurate object segmentation.

Other conventional digital image editing systems select an object in a digital image by applying a machine learning classification model. Specifically, conventional digital editing systems can apply a classification model that categorizes an object portrayed in a digital image into one of a plurality of object categories and then segments the object based on the determined object category. Unfortunately, these conventional tools also have a number of shortcomings.

As an initial matter, conventional systems that utilize classification models are rigid and limited in applicability. For example, conventional systems that utilize classification models generally utilize a limited number (e.g., 20 or 80) classification categories. Such limited numbers are far from sufficient to cover the variety of objects that individuals or businesses routinely encounter in digital visual media. In addition, conventional digital visual media systems that utilize classification models have high computational performance requirements that make them infeasible to operate on mobile devices. Indeed, applying such classification models on mobile devices requires far more memory and processing power than typical mobile devices can afford. Furthermore, conventional digital visual media systems that utilize classification models cannot operate in real-time across a plurality of digital images. For example, conventional digital visual media systems cannot segment objects portrayed in a real-time digital visual media feed (e.g., a live video feed from a smartphone camera).

These and other problems exist with regard to identifying objects in digital visual media.

SUMMARY

One or more embodiments described herein provide benefits and/or solve one or more of the foregoing or other problems in the art with systems, methods, and non-transitory computer-readable media that allow for efficient and accurate segmentation of objects portrayed in digital visual media utilizing salient content neural networks. In particular, in one or more embodiments, the disclosed systems utilize salient content neural networks to select objects portrayed within digital images directly on a mobile device. For example, in one or more embodiments, the disclosed systems train a salient content neural network to segment foreground and background pixels in a digital image. The disclosed systems then provide this trained salient content neural network to a mobile device to identify objects within digital visual media by segmenting foreground and background pixels in the digital visual media. Moreover, in one or more embodiments, the disclosed systems train and provide different salient content neural networks for application in static and real-time implementations. In this manner, the disclosed systems can identify an unlimited category of objects in static digital images, or real-time digital visual media feeds, utilizing the limited computing resources of a mobile device, while maintaining or improving accuracy of the resulting segmentation (i.e., greater than 96% IoU accuracy in some implementations).

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIGS. 4A-4D illustrate a mobile device with a graphical user interface for displaying segmented objects in digital visual media in accordance with one or more embodiments;

DETAILED DESCRIPTION

Figure 1:
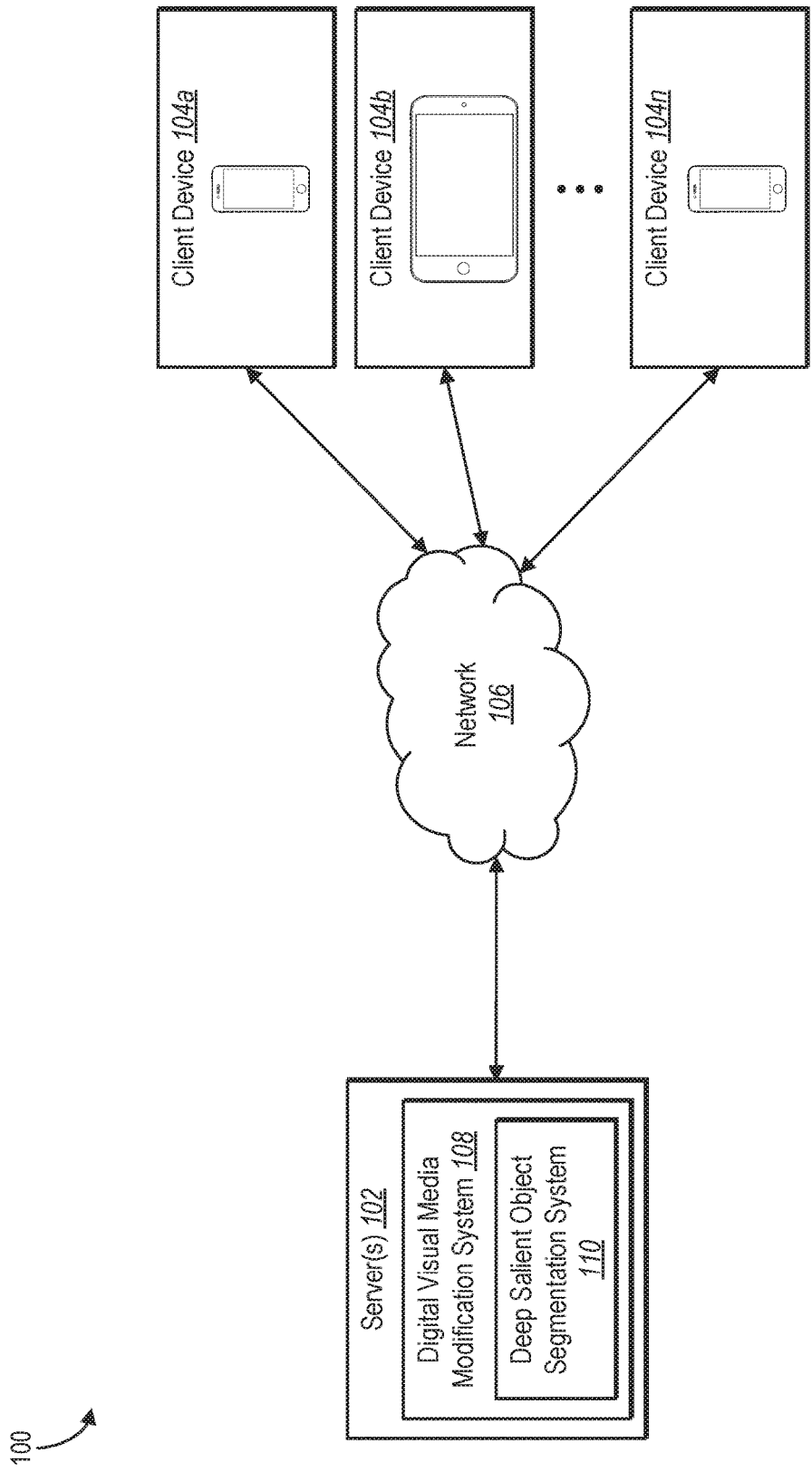
FIG. 1 illustrates a schematic diagram of an exemplary environment in which a deep salient object segmentation system can operate in accordance with one or more embodiments.

One or more embodiments of the present disclosure include a deep salient object segmentation system that identifies objects portrayed in digital visual media utilizing salient content neural networks. Indeed, in one or more embodiments, the deep salient object segmentation system utilizes a novel, reformulated approach to the semantic segmentation problem. Specifically, in one or more embodiments, given a digital image, the deep salient object segmentation system identifies and segments salient foreground pixels in the digital image to identify objects rather than classifying the objects into one or more categories and then segmenting objects based on the categories.

For example, in one or more embodiments, the deep salient object segmentation system utilizes salient content neural networks (that are significantly more compact and efficient than conventional classification algorithms) to select objects portrayed in digital visual media directly on a mobile device. Specifically, in one or more embodiments, the deep salient object segmentation system trains one or more salient content neural networks to segment foreground and background pixels in digital visual media and then provide the one or more trained salient content neural networks to a mobile device. The deep salient object segmentation system can then utilize the trained salient neural networks on the mobile device to segment objects in real-time digital visual media feeds and/or static digital images.

By utilizing salient content neural networks that are trained to segment foreground pixels and background pixels, the deep salient object segmentation system can resolve many of the problems described above with conventional systems. For example, the deep salient object segmentation system is not rigidly limited to a fixed number of object categories. Rather, utilizing salient content neural networks, the deep salient object segmentation system can select any object(s) portrayed in a digital image (i.e., object(s) that correspond to an unlimited number of object categories). Thus, the deep salient object segmentation system can improve flexibility over conventional systems.

In addition, in one or more embodiments, the deep salient object segmentation also improves computational efficiency. The deep salient object segmentation system can train and utilize one or more salient content neural networks that are much smaller, and less computationally intensive, than conventional classification models. By training salient content neural networks that efficiently segment foreground pixels (rather than classifying and segmenting classified objects) the deep salient object segmentation system requires less memory and processing resources.

Indeed, as a result of this improved computational efficiency, the deep salient object segmentation system can also be deployed more flexibly on a variety of computing devices. For instance, as mentioned above, the deep salient object segmentation system can apply one or more salient content neural networks directly in a mobile device with limited memory and processing power (such as a smartphone or tablet). Thus, although conventional systems often require high-powered servers or other computing devices to operate, the deep salient object segmentation system can allow mobile devices to identify and segment objects portrayed in digital images.

Furthermore, in one or more embodiments, the deep salient object segmentation system identifies objects in digital images in a wider-variety of applications than conventional systems. For example, the trained salient content neural network can utilize mobile devices to not only segment objects in static digital images, but can perform real-time segmentation in digital visual media feeds directly on the mobile device. Accordingly, the disclosed systems provide for accurate selection of objects in both static and real-time digital visual media directly on mobile devices by utilizing salient content neural networks that are capable of operating on the limited computing resources of mobile devices.

Moreover, the deep salient object segmentation system can provide these benefits without sacrificing accuracy and/or processing speed. For instance, unlike conventional systems that require tracing of objects portrayed in digital images, the deep salient object segmentation system can accurately and automatically identify objects portrayed in a digital image in real-time. Indeed, as mentioned above, in some embodiments, the deep salient object segmentation system can identify object pixels utilizing salient object neural networks with greater than 96% IoU accuracy directly on mobile devices.

As mentioned above, in one or more of the embodiments, the deep salient object segmentation system trains one or more salient content neural networks to segment foreground pixels from background pixels in digital visual media. In particular, in one or more of the embodiments, the deep salient object segmentation system utilizes a repository of training digital images to train a salient content neural network. For example, the deep salient object segmentation system can apply one or more salient content neural networks to a dataset of training digital images to generate a predicted mask (i.e., a prediction of foreground pixels). The deep salient object segmentation system can then train the salient content neural network by comparing the predicted mask with ground truth masks for the training digital images.

Furthermore, as mentioned above, in one or more embodiments, the deep salient object segmentation system can deploy one or more salient content neural networks to mobile devices. For example, in some embodiments, the deep salient object segmentation system generates two salient content neural networks: a static salient content neural network for analyzing static digital images and a real-time salient content neural network for analyzing real-time digital visual media feeds. To illustrate, the deep salient object segmentation system, in one or more embodiments, can generate a static salient content neural network that has more memory and/or processing power (but also greater accuracy) relative to a real-time salient content neural network. The deep salient object segmentation system can deploy both the static salient content neural network and the real-time salient content neural network to the mobile device.

For example, the deep salient object segmentation system can determine that a mobile device is capturing a real-time digital visual media feed. In response to this determination, the deep salient object segmentation system can utilize the real-time salient content neural network to analyze the real-time digital visual media feed and dynamically segment objects portrayed in the real-time digital visual media feed. The deep salient object segmentation system can also determine that a mobile device has captured (or is otherwise displaying) a static digital image. In response to this determination, the deep salient object segmentation system can utilize the static salient content neural network to analyze the static digital image and segment objects portrayed in the foreground of the static digital image.

In addition to selecting an object within digital visual media, the deep salient object segmentation system can also apply modifications to the digital visual media based on an identified object. For example, the deep salient object segmentation system can apply one or more styles or filters to a selected object (i.e. the foreground pixels). In this manner, the deep salient object segmentation system enable users to quickly, easily, accurately, and independently select and stylize objects portrayed in digital visual media (e.g., real-time digital visual media feeds and/or static digital images) directly on a mobile device.

Furthermore, in one or more embodiments, the deep salient object segmentation system also improves accuracy and efficiency by training the salient content neural networks from a trained object classification neural network. For example, the deep salient object segmentation system can access a trained object classification neural network and perform net surgery. To illustrate, the deep salient object segmentation system can access a trained object classification neural network that has one or more object classification channels and a background classification channel. The deep salient object segmentation system can utilize the one or more object classification channels and the background classification channel to identify initialization parameters for the salient content neural networks. Researchers have found that this approach results in faster training for the salient content neural networks and greater resulting accuracy.

In addition to initialization parameters, in performing net surgery on the trained object classification neural network, the deep salient object segmentation system can also determine other optimization parameters to improve efficiency and accuracy of training salient content neural networks. For example, in one or more embodiments, the deep salient object segmentation system utilizes an optimization salient content neural network to determine optimization parameters (such as weight decay parameters, iterations parameters, or initialization parameters). The deep salient object segmentation system can then apply the determined optimization parameters when training a real-time salient content neural network and/or a static salient content neural network.

As illustrated by the foregoing discussion, the present disclosure utilizes a variety of terms to describe features and advantages of the deep salient object segmentation system. Additional detail is now provided regarding the meaning of such terms. As used herein, the term "neural network" refers to a machine learning model that can be tuned (e.g., trained) based on training input to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network is an algorithm that implements deep learning techniques, i.e., machine learning that utilizes a set of algorithms to attempt to model high-level abstractions in data.

As used herein, the term "salient content neural network" refers to a neural network for identifying salient content in a digital image. In particular, the term "salient content neural network" includes a neural network trained to segment foreground pixels in a digital image (e.g., segment foreground pixels from background pixels). To illustrate, a salient content neural network can generate a mask of foreground pixels reflecting salient objects a digital image. For example, as discussed in greater detail below, a "salient content neural network" includes a DeepLab neural network, a GoogLeNet neural network, and/or a DenseNet neural network trained to segment foreground pixels in a digital image.

Furthermore, as used herein, the term "real-time salient content neural network" refers to a salient content neural network utilized to segment objects portrayed in a real-time digital visual media feed. As described in greater detail below, in one or more embodiments, the deep salient object segmentation system utilizes a modified DenseNet neural network as a real-time salient content neural network.

Moreover, as used herein, the term "digital visual media" refers to any digital item capable of producing a visual representation. For instance, the term "digital visual media" includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF.

In addition, as used herein, the term "real-time digital visual media feed" refers to a stream of digital visual media. In particular, the term "real-time digital visual media feed" includes a stream of digital images captured by a camera (e.g., a digital video captured by a camera). For example, in one or more embodiments, a real-time digital visual media feed may include digital video from a camera on a mobile device displayed on a display screen of the mobile device (e.g., displayed simultaneously, or near-simultaneously, as the camera captures the digital video). Furthermore, the term "real-time digital visual media feed" also comprises a stream of digital images that are available on a mobile device without utilizing the mobile device's camera (i.e., a streamed video file).

In addition, as used herein, the term "static salient content neural network" refers to a salient content neural network utilized to segment objects portrayed in a static digital image. In particular, a static salient content neural network includes a salient content neural network applied to digital images that are not currently being streamed to a display as part of a real-time digital visual media feed. As described in greater detail below, in one or more embodiments, the deep salient object segmentation system utilizes a GoogLeNet as a static salient content neural network.

Moreover, as used herein, the term "static digital image" ("digital image" or "captured digital image") refers to any digital symbol, picture, icon, or visual illustration. In particular, the term static digital image (digital image or captured digital image) refers to a digital image captured by a mobile device and subsequently analyzed by the deep salient object segmentation system. For example, a static digital image includes digital files with the following file extensions: JPG, TIFF, BMP, PNG, RAW, or PDF. Moreover, the term static digital image (or captured digital image) can include any digital visual media in its post-processing stage. The term static digital image can include a digital image captured and processed from a digital video or a digital video that is stored on any computing device (i.e., not a real-time digital visual media feed). In particular, the term static digital image includes video files that are captured on a mobile device. Furthermore, the term static digital image can include image/video files in the post-processing stage such as a stage when users can refine the captured image/video or upload an image/video to another source (i.e., an application). Similarly, the term static digital image can include an image/video uploaded to an application (e.g., on a mobile device and/or a server).

In addition, as used herein, the term "foreground pixels" refers to pixels portraying a salient object in a digital image. In particular, the term "foreground pixels" includes pixels that reflect an object of measurable distinctiveness in a region or scene (e.g., a scene portrayed in a digital image). Specifically, foreground pixels include pixels that reflect an object with distinctive perceptual qualities (e.g., color, focus, depth, and/or position) that make the item measurably different from background pixels in a digital image (e.g., a salient object). For example, in a digital portrait (or "selfie"), foreground pixels include those pixels portraying the person in the digital portrait (while background pixels include those pixels that are not foreground pixels and do not portray the person in the digital portrait).

Moreover, as used herein, the term "mask" refers to a digital item reflecting selected pixels (e.g., foreground pixels) in a digital image. For instance, the term "mask" includes a boundary, matrix, array, index, digital file, or other set of pixels that reflect foreground pixels (i.e., salient objects) portrayed in a digital image. Additionally, as used herein, the term "ground truth mask" includes a mask of a known set of pixels reflecting an object portrayed in a digital image. Similarly, a "predicted mask" includes a mask of foreground pixels (i.e., a salient object) predicted (or generated) by a salient content neural network.

As used herein, the modifier "training" (e.g., as used in training digital image or other training data) indicates any object or information utilized to train a neural network. Thus, for example, "training digital image" refers to any digital image that is used to train a neural network. For example, in one or more embodiments, the term "training digital image" includes digital images that the deep salient object segmentation system provides to a neural network to train the neural network to predict foreground pixels. For example, a training digital image can include a digital image that portrays a human or pet that the deep salient object segmentation system analyzes via a salient content neural network to generate a predicted set of foreground pixels that are utilized to train the salient content neural network.

As used herein, the term "mobile device" refers to a portable computing device. In particular, a "mobile device" includes a computing device designed for routine operation while a user is moving with the mobile device. For example, in one or more embodiments, a mobile device includes a smartphone or tablet. A mobile device also includes a portable device without hardware designed to run a neural network.

In addition, as used herein, the term "object classification neural network" refers to a neural network that is trained to classify objects portrayed in digital visual media. For example, an object classification neural network includes a neural network that is trained to classify objects in digital visual media and select the classified objects based on their classification. For example, an object classification neural network includes a neural network that is trained to identify multiple individual objects and a background (i.e., a person classification, a pet classification, a vehicle classification, and a background classification).

Further, as used herein, the term "object classification channel" refers to parameters associated with an object classification neural network that are utilized to classify and/or identify an object in digital visual media. For example, in one or more embodiments, an object classification channel may include parameters, such as weights, that assist trained object classification neural network to accurately classify and/or identify a specific object. For example, in one or more embodiments, an object classification channel may include a person classification channel which contains parameters that assist to accurately identify persons in digital visual media.

Turning now to FIG. 1, additional detail will be provided regarding an environment for implementing the deep salient object segmentation system. In particular, FIG. 1 illustrates a schematic diagram of one embodiment of an exemplary environment 100 in which a deep salient object segmentation system 110 can operate. In one or more embodiments, the environment 100 includes server(s) 102 connected to a plurality of client devices 104a-104n via a network 106. The client devices 104a-104n, the network 106, and the server(s) 102 may communicate with each other or other components using a variety of communication technologies. Indeed, the network 106 may be any suitable network over which the client devices 104a-104n may access the server(s) 102, or vice versa. The network 106 will be discussed in more detail below with regard to FIG. 10.

As illustrated in FIG. 1, the environment 100 may include client devices 104a-104n. The client devices 104a-104n may comprise any computing device, including computing devices described below with regard to FIG. 10. For example, client devices 104a-104n may comprise one or more mobile devices, including mobile phones or tablets. Although three client devices are presented with regard to FIG. 1, it will be appreciated that client devices 104a-104n may comprise any number of client devices (greater or smaller than shown).

In addition, the environment 100 may also include the server(s) 102. The server(s) 102 may generate, store, receive, and transmit any type of data, including, for example: a training image repository, one or more neural networks, and/or digital image data. For example, the server(s) 102 may receive data from a client device, such as the client device 104a, and send the data to another client device, such as the client device 104b and/or 104n. In one example embodiment, the server(s) 102 is a data server. The server(s) 102 can also comprise a communication server or a web-hosting server. Additional details regarding the server(s) 102 will be discussed below with respect to FIG. 10.

As shown in FIG. 1, in one or more embodiments, the server(s) 102 can include a digital visual media modification system 108 that also implements at least a portion of the deep salient object segmentation system 110. The digital visual media modification system 108 can store one or more digital visual media items and modify one or more digital visual media items. Furthermore, the digital visual media modification system 108 can include software and/or hardware tools that allow users of the client devices 104a-104n to store and/or modify digital visual media.

Furthermore, as illustrated in FIG. 1, the digital visual media modification system 108 can include the deep salient object segmentation system 110. The deep salient object segmentation system 110 can comprise an application running on the server(s) 102 or a portion of the deep salient object segmentation system 110 can be downloaded from the server(s) 102. For example, the deep salient object segmentation system 110 can include a web hosting application that allows the client devices 104a-104n to interact with content hosted at the server(s) 102.

As mentioned above, the deep salient object segmentation system 110 can generate one or more salient content neural networks and provide the one or more salient content neural networks to a mobile device. By way of example, in one or more embodiments, the deep salient object segmentation system 110 utilizes the server(s) 102 to generate a trained salient content neural network, such as a real-time salient content neural network or a static salient content neural network. For example, the deep salient object segmentation system 110 can access a training image repository with digital training images and corresponding ground truth masks. The deep salient object segmentation system 110 can then train a real-time salient content neural network and a static salient content neural network utilizing the digital training images and corresponding ground truth masks. Specifically, the deep salient object segmentation system 110 can train the real-time salient content neural network and the static salient content neural network to identify salient objects (e.g., foreground and background pixels) in new digital images. Additional detail regarding training the real-time salient content neural network and the static salient content neural network is provided below (e.g., in relation to FIGS. 2, 3, 5, and 6).

Upon training one or more salient content neural networks, the deep salient object segmentation system 110 can then utilize the server(s) 102 to provide the one or more neural networks to the client device 104*a* (and/or the client devices 104*b*-104*n*). For instance, the deep salient object segmentation system 110 can provide a real-time salient content neural network and/or a static salient content neural network to the client device 104*a* (i.e., a mobile device) as part of a digital image editing application installed on the client device 104*a*. The deep salient object segmentation system 110 can then utilize the client device 104*a* (and the digital image editing application) to apply the real-time salient content neural network and/or the static salient content neural network.

For example, the deep salient object segmentation system 110 can utilize the client device 104*a* to capture a real-time digital visual media feed (e.g., a live video feed from a smartphone camera). The deep salient object segmentation system 110 can then apply the real-time salient content neural network to the real-time digital visual media feed at the client device 104*a* to identify and provide for display a salient object in the real-time digital visual media feed. The deep salient object segmentation system 110 can also capture a static digital image via the client device 104*a* (e.g., a digital image from the real-time digital visual media feed) and apply the static salient content neural network to the static digital image. In this manner, the deep salient object segmentation system 110 can identify and provide for display a salient object in the digital image.

Upon identifying one or more salient objects in digital visual media, the deep salient object segmentation system 110 can also modify the digital visual media. For example, the deep salient object segmentation system 110 can identify a salient object and move, copy, paste, or delete the selected salient object based on additional user input.

As just described, the deep salient object segmentation system 110 may be implemented in whole, or in part, by the individual elements 102-106 of the environment 100. It will be appreciated that although certain components of the deep salient object segmentation system 110 are described in the previous examples with regard to particular elements of the environment 100, various alternative implementations are possible. For instance, in one or more embodiments, the deep salient object segmentation system 110 is implemented on the client device 104*a*. Similarly, in one or more embodiments, the deep salient object segmentation system 110 may be implemented on the server(s) 102. Moreover, different components and functions of the deep salient object segmentation system 110 may be implemented separately among client devices 104*a*-104*n*, the server(s) 102, and the network 106.

As just mentioned, the deep salient object segmentation system 110 can train one or more salient content neural networks to select salient objects in digital visual media. For example, FIG. 2 illustrates the deep salient object segmentation system 110 generating a trained salient content neural network in accordance with one or more embodiments. In particular, in relation to FIG. 2A, the deep salient object segmentation system 110 utilizes the training image repository 202, the predicted mask 208, and the loss function 212 to train the salient content neural network 206 to generate the trained salient content neural network 216.

Figure 2A:
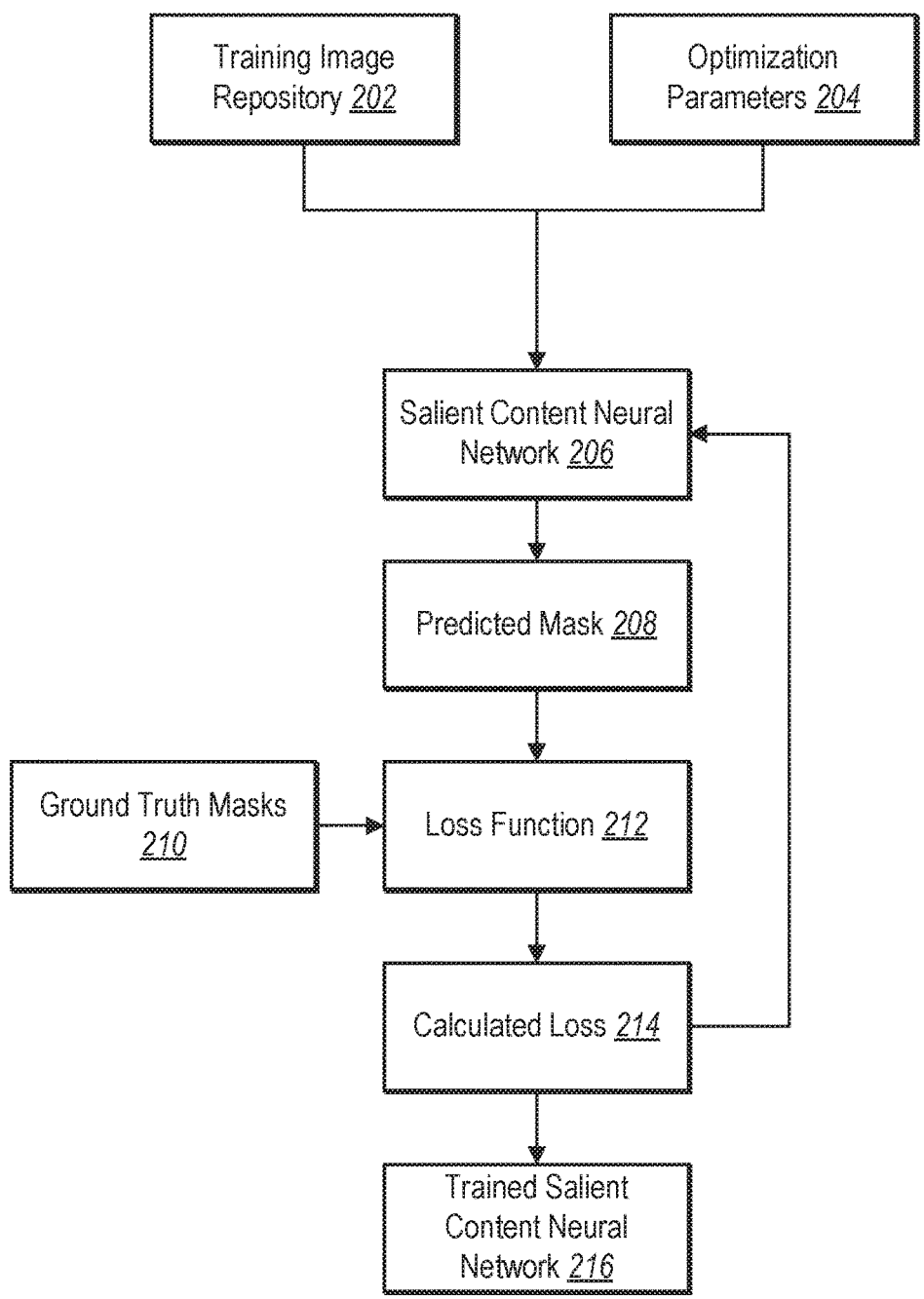
FIG. 2A illustrates a flow chart of training a salient content neural network in accordance with one or more embodiments.

More specifically, as shown in FIG. 2A, the deep salient object segmentation system 110 obtains and/or identifies training digital visual media items from the training image repository 202. The training image repository 202 can comprise any group or collection of digital visual media items. For instance, in one or more embodiments, the training image repository 202 comprises a repository of digital images stored on a remote server. For example, in one or more embodiments, the training image repository 202 comprises the Flickr Humans & Pets dataset (i.e., digital images portraying humans and/or pets), the Flickr Portrait dataset (i.e., digital images portraying human portraits), the MSCOCO Person dataset, the DUT-OMRON dataset, the MSRA10K dataset, the Pascal Foreground dataset (e.g., digital images portraying various objects), and/or the Pascal VOC dataset (e.g., digital images portraying 20 different categories of objects).

In relation to FIG. 2A, the digital visual media in the training image repository 202 also correspond to the ground truth masks 210. In particular, the training image repository 202 includes a ground truth mask for each training digital visual media item, where the ground truth mask defines pixels corresponding to salient objects. For example, the training image repository 202 can include the ground truth masks 210, where each of the ground truth masks 210 define foreground pixels (and/or background pixels) in the training digital images in the training image repository 202.

As shown in FIG. 2A, the deep salient object segmentation system 110 can also utilize optimization parameters 204 to train the salient content neural network 206. In particular, the optimization parameters 204 include adjustable variables that impact the time, speed, accuracy, and/or processing power to train the salient content neural network 206. For example, in one or more embodiments, the optimization parameters 204 include initialization parameters (e.g., initialization weights for various features or characteristics of the neural network), weight decay parameters (e.g., variables to compensate for overfitting when training the salient content neural network 206), or iteration parameters (e.g., number of iterations to perform when training the salient content neural network 206). Furthermore, in one or more embodiments, the deep salient object segmentation system 110 can identify the optimization parameters 204 by performing net surgery (discussed below in FIGS. 5-6).

Moreover, as shown in FIG. 2A, the deep salient object segmentation system 110 utilizes the training image repository 202 and the optimization parameters 204 to train the salient content neural network 206. In particular, the deep salient object segmentation system 110 can utilize the salient content neural network 206 to predict foreground pixels (and/or background pixels) of the training digital visual media from the training image repository 202. Specifically, as illustrated in FIG. 2A, the deep salient object segmentation system 110 utilizes the salient content neural network 206 to generate the predicted masks 208 of the training digital images from the training image repository 202 (e.g., masks of predicted foreground pixels for the training digital images).

In one or more embodiments, the salient content neural network 206 utilizes the training digital images from the training image repository 202, the optimization parameters 204, and the predicted mask 208 to learn to identify salient objects in the foreground of digital visual media. In particular, the deep salient object segmentation system 110 compares the predicted masks 208 with the ground truth masks 210. For instance, as illustrated in FIG. 2A, the deep salient object segmentation system 110 compares the predicted masks 208 and the ground truth masks 210 utilizing a loss function 212 that generates a calculated loss 214. Specifically, the loss function 212 can determine a difference between the ground truth masks 210 and the predicted masks 208 (e.g., pixels in the predicted masks 208 improperly identified as foreground and/or background pixels relative to the ground truth masks 210).

Further, as shown in FIG. 2A, the salient content neural network 206 then utilizes the calculated loss 214 to learn to more accurately predict masks (e.g., salient objects). Specifically, the deep salient object segmentation system 110 utilizes the calculated loss 214 and provides this information to the salient content neural network 206 in order to adjust the parameters of the salient content neural network 206. In particular, the deep salient object segmentation system 110 can modify parameters of the salient content neural network 206 to minimize the calculated loss 214 and predict masks that more accurately reflect the ground truth. In one or more embodiments, the deep salient object segmentation system 110 repeatedly generates predicted masks (i.e., according to the optimization parameters 204) and modifies parameters of the salient content neural network 206 to generate the trained salient content neural network 216.

Although FIG. 2A illustrates a singular salient content neural network 206, the deep salient object segmentation system 110 can train a plurality of neural networks. For example, in one or more embodiments, the salient content neural network 206 can include both a real-time salient content neural network and a static salient content neural network. In particular, in one or more embodiments, salient content neural network 206 can include a GoogLeNet neural network (i.e., a modified version of the GoogLeNet neural network) and/or a DenseNet neural network (i.e., a modified version of the DenseNet neural network).

Figure 2B:
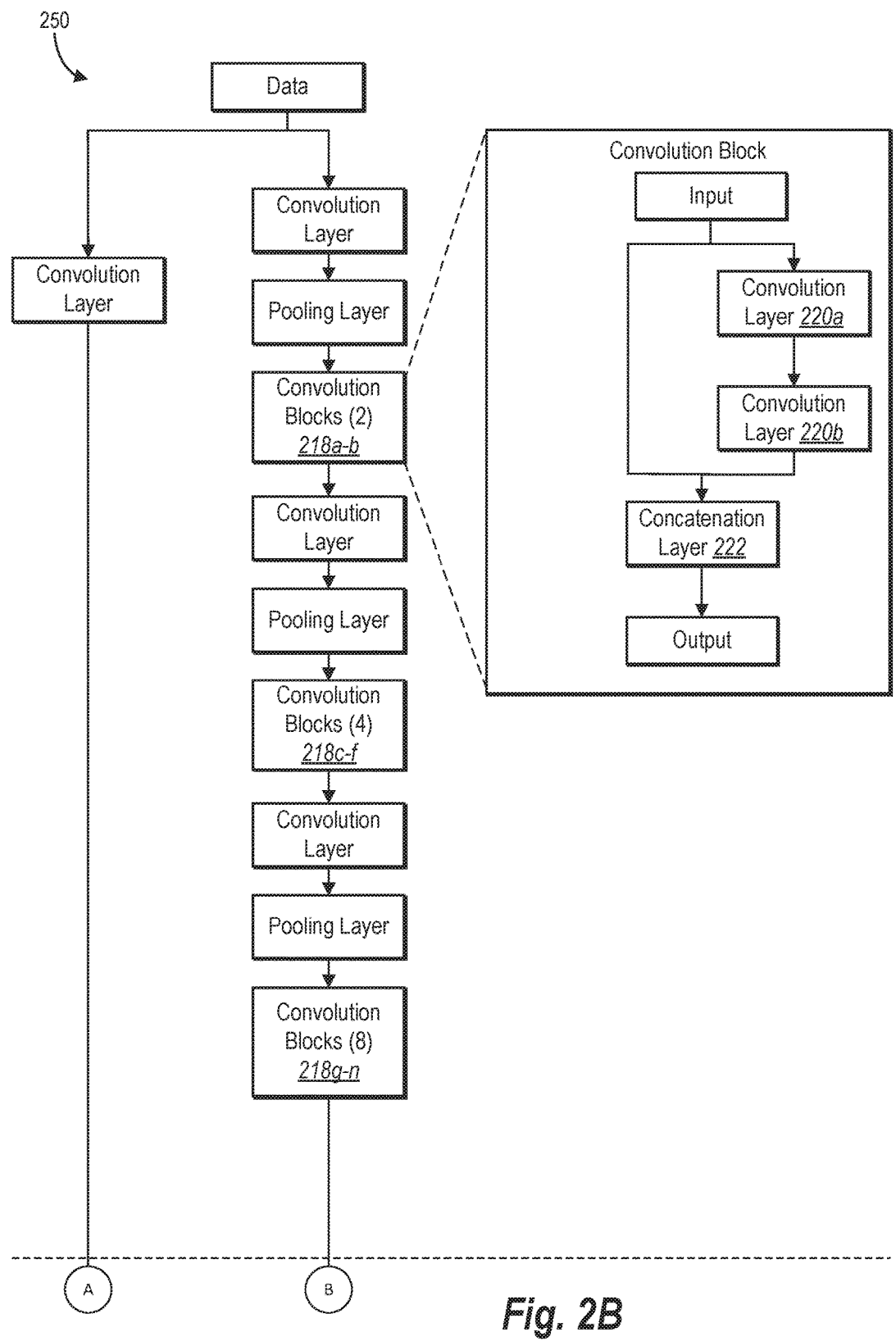
FIGS. 2B-2C illustrate an exemplary architecture of a real-time salient content neural network in accordance with one or more embodiments.
Figure 2C:
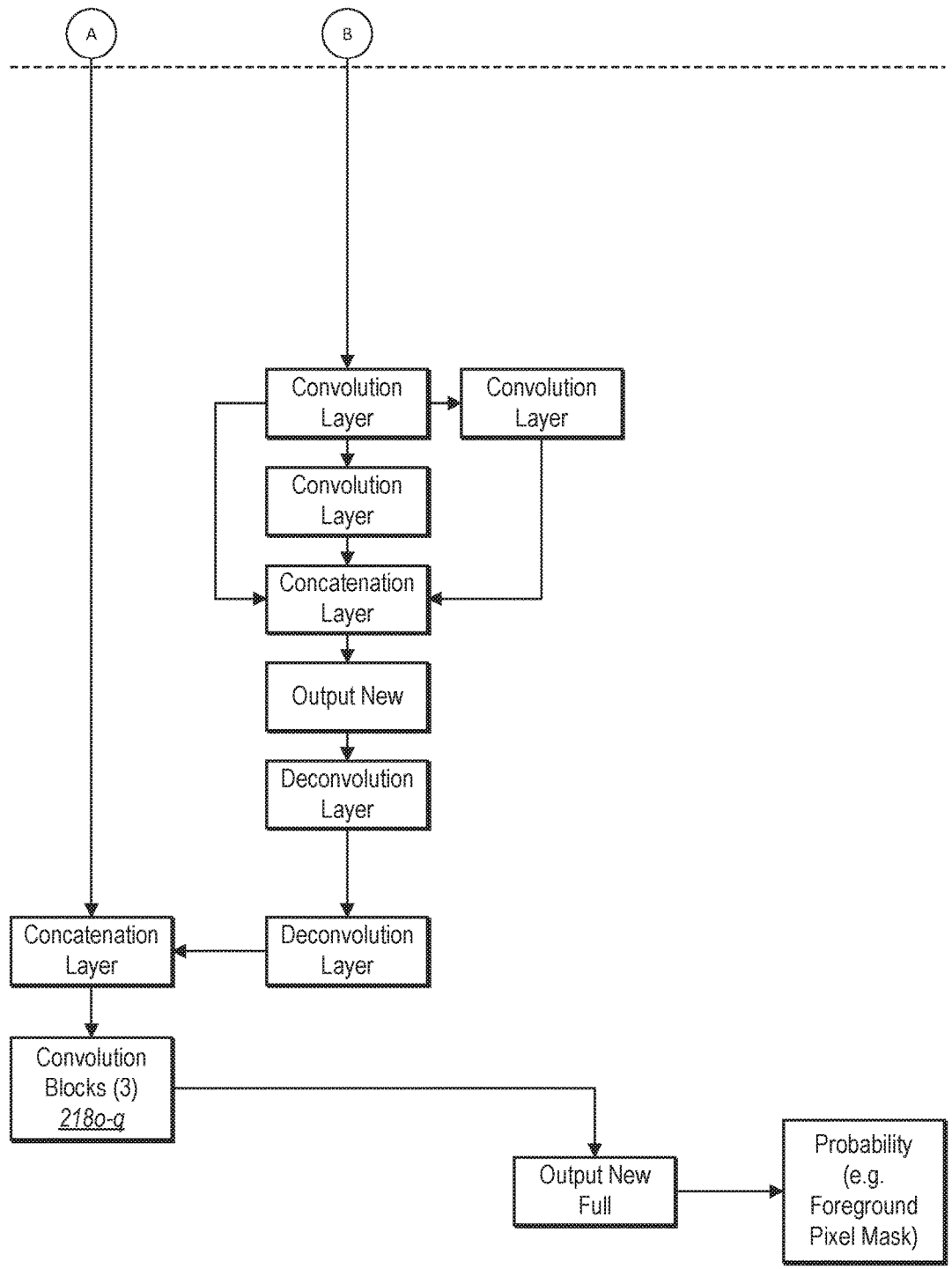
Figure 2D:
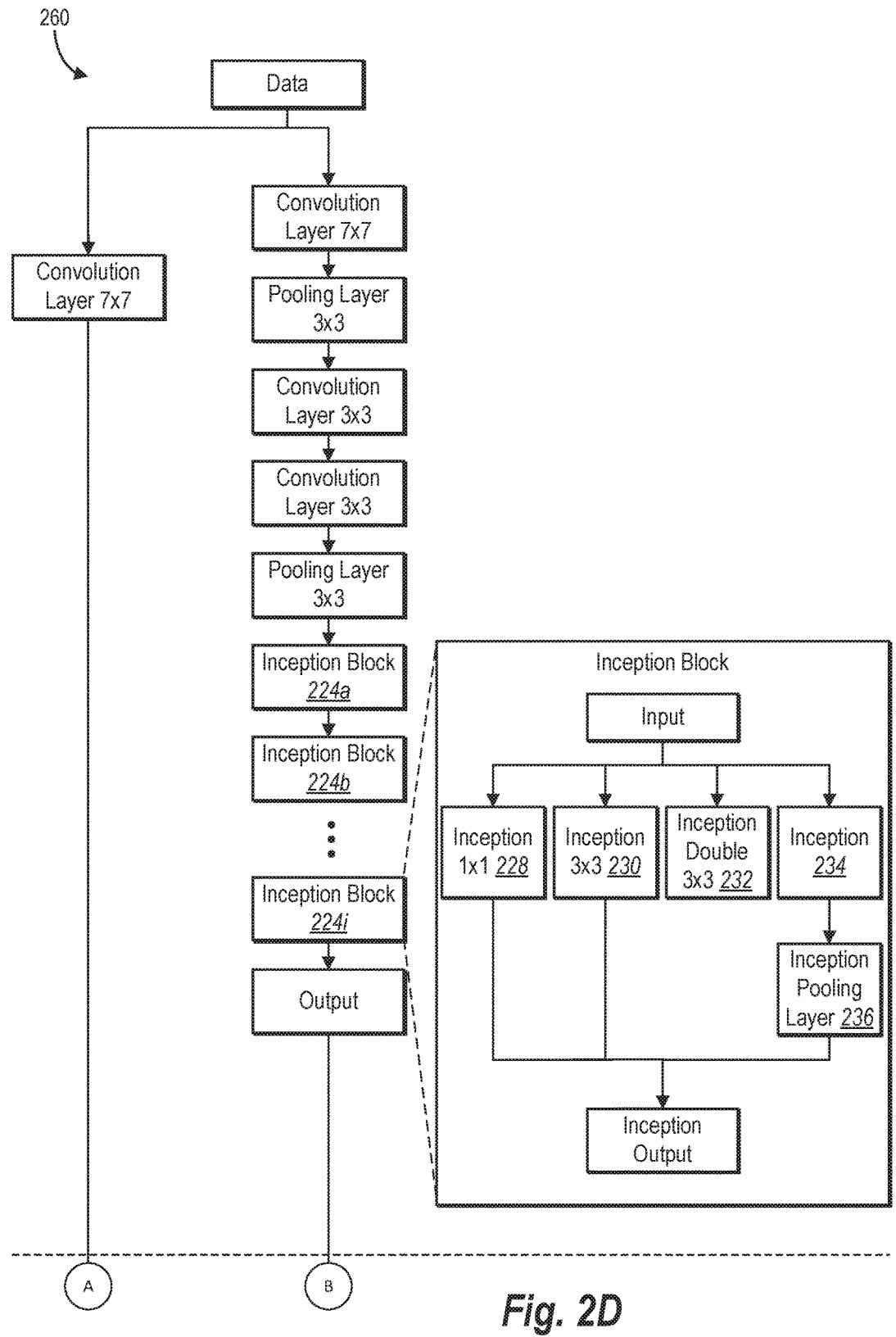
FIGS. 2D-2E illustrate an exemplary architecture of a static salient content neural network in accordance with one or more embodiments.
Figure 2E:
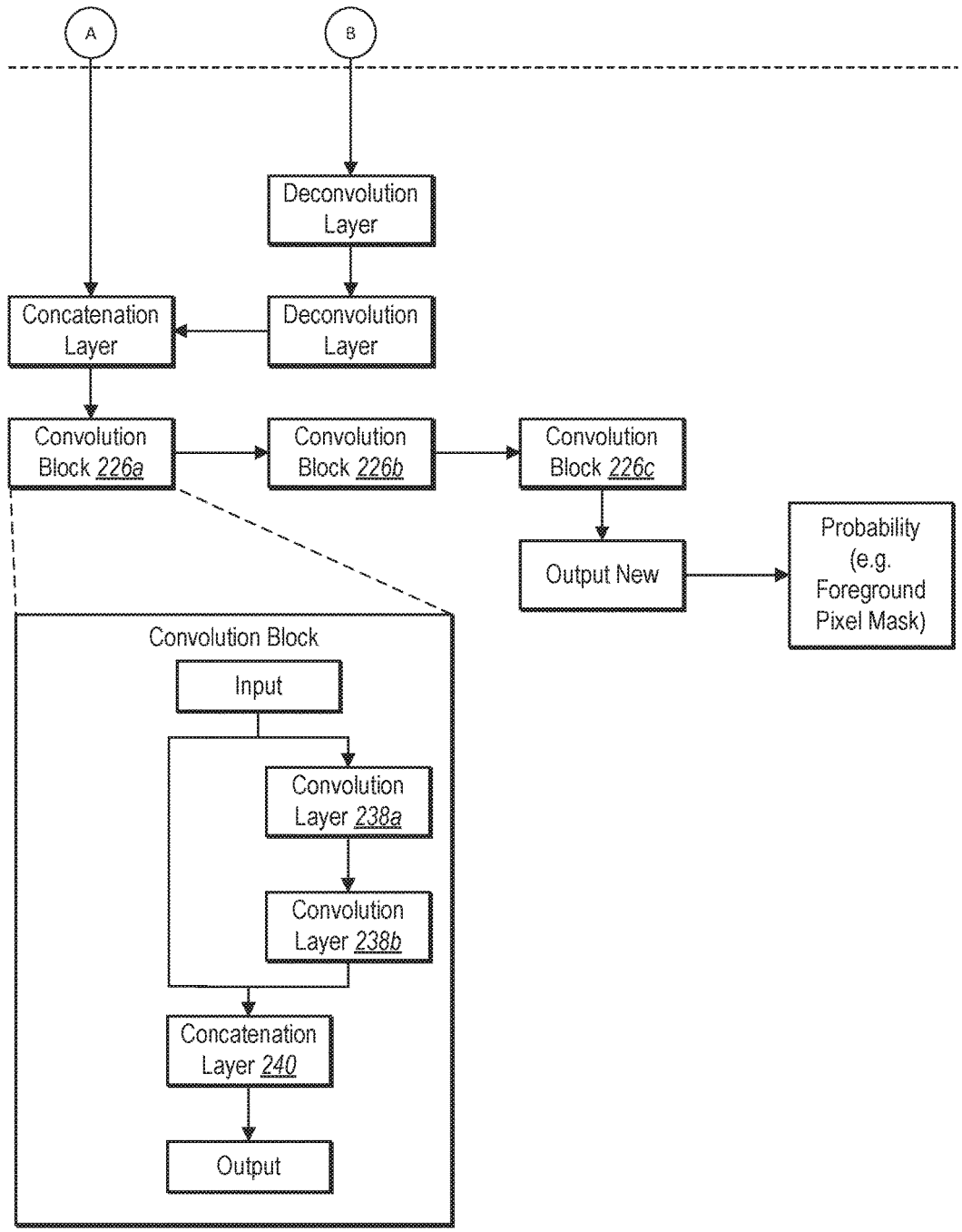

Indeed, FIGS. 2B-2E illustrate exemplary architecture of salient content neural networks utilized by the deep salient object segmentation system 110 in accordance with one or more embodiments. In particular, FIGS. 2B-2C illustrate an exemplary real-time salient content neural network (e.g., a modified DenseNet neural network) and FIGS. 2D-2E illustrate an exemplary architecture for a static salient content neural network (e.g., a modified GoogLeNet neural network).

As just mentioned, in one or more embodiments, the deep salient object segmentation system 110 utilizes a modified DenseNet neural network as a real-time salient content neural network. As used herein, a DenseNet neural network refers to a convolutional neural network that connect a plurality of layers with future layers. In particular, a DenseNet includes a neural network architecture that connects all layers (with matching feature-map sizes) directly with each other. In other words, a DenseNet includes an architecture that obtains inputs from preceding layers and passes on its own feature-maps to subsequent layers. In some instances, a DenseNet architecture connects convolution layers (i.e., obtains inputs from previous convolution layers) for all convolution layers within a dense block. A DenseNet architecture can include on or more of these dense blocks. Indeed, in one or more embodiments, the deep salient object segmentation system 110 utilizes a DenseNet neural network, as described in Gao Huang, Zhuang Liu, Kilian Q. Weinberger, and Laurens V. D. Maaten, *Densely Connected Convolutional Networks*, Computer Research Repository 1608.06993, http://arxiv.org/abs/1608.06993 (2016), which is incorporated herein by reference.

More specifically, FIGS. 2B, 2C illustrate an exemplary architecture of a modified DenseNet neural network for a real-time salient content neural network 250 in accordance with one or more embodiments of the deep salient object segmentation system 110. As shown, the real-time salient content neural network 250 includes a plurality of layers. In particular, the real-time salient content neural network 250 include convolution layers, pooling layers, convolution blocks 218a-218q, concatenation layers, and deconvolution layers. Moreover, the convolution blocks 218a-218q each include convolution layers (e.g., the convolution layers 220a-22b, and a concatenation layer) as illustrated in FIG. 2B.

In FIGS. 2B, 2C the convolution layers, pooling layers, convolution blocks 218a-218q, concatenation layers, and deconvolution layers can receive input (i.e., feature maps) and can also provide an output (i.e., feature maps). In one or more embodiments, each of the layers (e.g., each of the convolution layers) are connected to subsequent layers (e.g., the output of each convolution layer is provided to all subsequent convolution layers in the real-time salient content neural network 250). In other embodiments, the deep salient object segmentation system 110 provides output of convolution layers to other convolution layers within particular dense blocks. For instance, the deep salient object segmentation system 110 can utilize the convolution blocks 218a-218b as a first dense block, the convolution blocks 218c-f as a second dense block, and the convolution blocks 218g-218n as a third dense block. Thus, the deep salient object segmentation system 110 can provide output of each layer within each dense block to subsequent layers within the dense block.

As mentioned above, a real-time salient content neural network can require less storage, time, and computing resources to utilize than conventional neural networks. For example, in one or more embodiments, the real-time salient content neural network 250 is approximately 7 M in size with a runtime of 60-70 ms per image. The deep salient object segmentation system 110 can utilize the faster run time of the real-time salient content neural network to identify objects in real-time digital visual media feeds without compromising on accuracy. For example, the real-time salient content neural network 250 is capable of segmenting foreground pixels in digital images with a 90.37% IoU on the Flickr-hp dataset.

As mentioned above, the deep salient object segmentation system 110 can also utilize a second salient content neural network. In particular, the deep salient object segmentation system 110 can utilize a real-time salient content neural network to analyze real-time digital visual media feeds and a static salient content neural network for static digital images (e.g., to refine a static digital image captured from a real-time digital visual media feed). In one or more embodiments, the deep salient object segmentation system 110 utilizes a modified GoogLeNet neural network as a static salient content neural network.

As used herein, GoogLeNet refers to a neural network that utilizes a plurality of inception modules. In particular, GoogLeNet includes a neural network that utilizes a plurality of inception models that concatenate feature-maps produced by filters of different sizes. For instance, a GoogLeNet utilizes inception modules that comprise convolution layers of different filter sizes. The inception modules can apply dimension reductions and projections to control computational requirements. For example, in one or more embodiments, the deep salient object segmentation system 110 utilizes a GoogLeNet neural network, as described in C. Szegedy, W. Liu, Y. Q. Jia, P. Sermanet, S. Reed, D. Anguelov, D. Erhan, V. Vanhoucke, and A. Rabinovich, *Going deeper with convolutions*, Computer Research Repository 1409.4842 (2015), which is incorporated herein by reference.

More specifically, FIGS. 2D, 2E illustrate an exemplary architecture of a modified GoogLeNet neural network for a static salient content neural network 260 in accordance with one or more embodiments of the deep salient object segmentation system 110. As shown, the static salient content neural network 260 includes a plurality of inception blocks 224a-224l. Furthermore, the static salient content neural network 260 includes convolution layers (7×7), pooling layers (3×3), convolution layers (3×3), inception blocks 224a-224l, deconvolution layers, concatenation layers, and convolution blocks 226a-226c. As illustrated in FIG. 2D, the inception blocks 224a-224l each include additional inception layers 228-234 and an inception pooling layer 236. In some embodiments, one or more of the inception blocks 224a-224l may not include the inception pooling layer 236. In one or more embodiments, the inception layers 228-234 within the inception blocks 224a-224l are convolution layers.

Furthermore, FIGS. 2D, 2E also include convolution blocks 226a-226c. As discussed above, the convolution blocks can receive input and pass input through two convolution layers 238a-238b followed by a concatenation layer 240 and also directly through the concatenation layer 240.

As mentioned above, the deep salient object segmentation system 110 can generate a static salient content neural network that requires less time to process and segment foreground pixels in a digital image compared to conventional object segmentation neural networks or other neural networks. However, in some embodiments, the static salient content neural network can require more time to process and segment foreground pixels in a digital image compared to the real-time salient content neural network. Therefore, in one or more embodiments, the real-time salient content neural network can have a faster processing speed (i.e., the capability to identify a salient object in digital visual media with less time) compared to a static salient content neural network. For example, in one or more embodiments, the salient content neural network is approximately 40 M in size with a runtime of 250-300 ms per image. The runtime of 250-300 ms per image of the modified GoogLeNet neural network is utilized to segment foreground pixels in a digital image without compromising on accuracy. For example, the modified GoogLeNet neural network is capable of segmenting foreground pixels in digital images with a 91.9% IoU on the Flickr-hp dataset.

As established in relation to FIGS. 2B-2E, the deep salient object segmentation system 110 can modify the DenseNet and/or GoogLeNet architectures to generate a salient content neural network. For example, in one or more embodiments, the deep salient object segmentation system 110 reduces the number of layers in the architecture to reduce the storage, processing power, and time required to apply the real-time salient content neural network. Similarly, in one or more embodiments, the deep salient object segmentation system 110 also reduces input size and network parameters to minimize the storage, processing power, and time.

To illustrate, in one or more embodiments, the deep salient object segmentation system 110 jointly considers the input size of layers and the number of neural network parameters in each layer in generating an architecture for the salient content neural network. In particular, the deep salient object segmentation system 110 can reduce the number of parameters in a layer that has a large input size and increase the number of parameters in a layer that has a smaller input size.

For example, in a first layer of a salient content neural network (e.g., the static salient content neural network), digital image size may be 224×224×3. Because spatial resolution in such circumstances is relatively large, the deep salient object segmentation system 110 can reduce parameters in the first neural network layer (e.g., reduce the number of channels in the convolution layer to three). However, after application of additional layers in the neural network, the special size of input becomes smaller. For instance, after application of some neural network layers, the spatial size of the input can reduce to one-quarter of the original size (e.g., 56×56). As the special dimension decreases, the deep salient object segmentation system 110 can increase the parameters of the neural network (e.g., increase to 48 channels, resulting in a size of 56×56×48).

As mentioned above, upon training one or more salient content neural network the deep salient object segmentation system 110 can provide the one or more trained salient content neural networks to a mobile device. Specifically, the deep salient object segmentation system 110 can provide trained salient content neural networks (i.e., such as those described in relation FIGS. 2A-2E) to a mobile device and apply the trained salient content neural networks to digital visual media captured by the mobile device. For example, FIG. 3 illustrates an exemplary sequence of acts 302-320 performed by the deep salient object segmentation system 110 for utilizing a real-time salient content neural network and a static salient content neural network at a mobile device 300 to identify objects in digital visual media.

Figure 3:
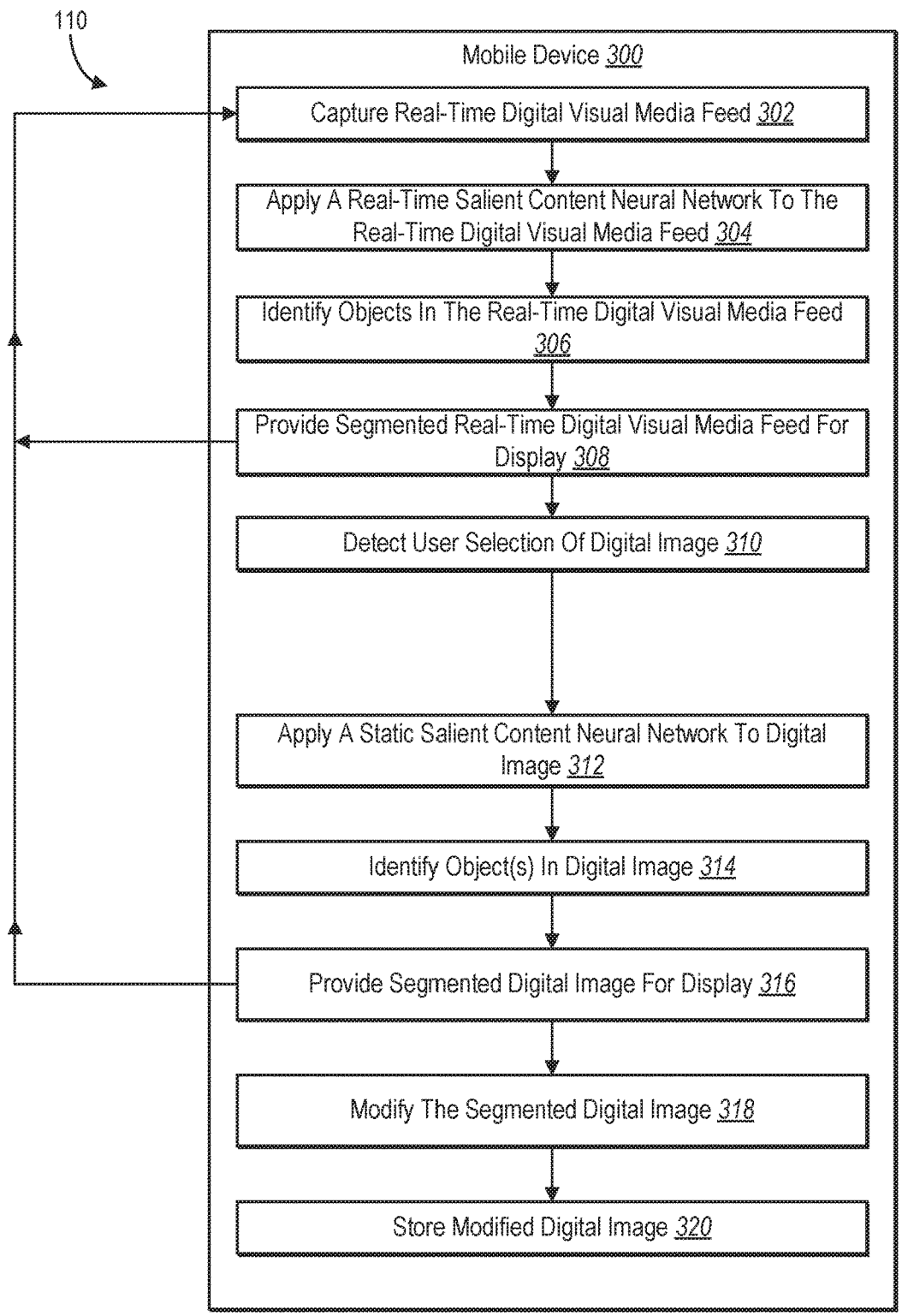
FIG. 3 illustrates a flow chart of utilizing one or more salient content neural networks on a mobile device in accordance with one or more embodiments.

Specifically, FIG. 3 illustrates the deep salient object segmentation system 110 utilizing a mobile device 300 to perform the act 302 of capturing a real-time digital visual media feed. As mentioned above, the act 302 can include the deep salient object segmentation system 110 utilizing a digital camera of a smartphone to capture a digital video (or accessing a stream of digital video stored on the mobile device 300). Moreover, the act 302 can include providing a digital video for display via a display screen of the mobile device.

Further, as shown in FIG. 3, the deep salient object segmentation system 110 also utilizes the mobile device 300 to perform the act 304 of applying a real-time salient content neural network to the real-time digital visual media feed. In particular, the act 304 can include applying a real-time salient content neural network to the real-time digital visual media feed to identify an object in the real-time digital visual media feed. Indeed, as described in FIG. 2, the deep salient object segmentation system 110 can train a real-time salient content neural network to predict salient objects and then apply the real-time salient content neural network to digital images of the real-time digital visual media feed captured at the mobile device 300 to identify objects portrayed in the real-time digital visual media feed.

After identifying one or more objects in the real-time digital visual media feed, the deep salient object segmentation system 110 also performs the act 308 of providing the segmented real-time digital visual media feed for display on the mobile device (e.g., via a graphical user interface described in more detail in FIG. 4 below). For instance, the deep salient object segmentation system 110 can modify the real-time digital visual media feed to emphasize an object in the digital visual media feed. To illustrate, the deep salient object segmentation system 110 can highlight an individual portrayed in a digital visual media feed and provide the highlighted individual for display as part of the real-time digital visual media feed. Similarly, the deep salient object segmentation system 110 can apply a filter to an object portrayed in a digital visual media feed and provide the filtered object for display as part of the digital visual media feed.

Moreover, as shown, the mobile device can continuously (i.e., in a loop) capture the real-time digital visual media feed (the act 302), apply the real-time salient content neural network to the real-time digital visual media feed (the act 304), identify object(s) in the real-time digital visual feed (the act 306), and provide the segmented real-time digital visual media feed for display (the act 308). Although FIG. 3 illustrates the mobile device 300 performing the acts 302-308 iteratively, in one or more embodiments, a user perceives the elements 302-308 as occurring simultaneously, or near-simultaneously, on the mobile device 300.

The deep salient object segmentation system 110 (via the mobile device 300) can continuously repeat elements 302 through 308 until detecting user interaction with the digital visual media feed. For example, the mobile device 330 can detect a user selection of a digital image 310 from the real-time digital visual media feed (e.g., by user-selection of a capture button). The mobile device in FIG. 3 can stop performing elements 302-308 when the mobile device detects a user selection of a digital image 310 from the real-time digital visual media feed.

Moreover, as shown in FIG. 3, the deep salient object segmentation system 110 can also utilize the mobile device 300 to perform the act 312 of applying a static salient content neural network to a digital image. In particular, in one or more embodiments, the deep salient object segmentation system 110 performs the act 312 after the mobile device 300 detects user selection of a digital image (at the act 310). Thus, the deep salient object segmentation system 110 can apply the static salient content neural network to refine an identified object in a digital image captured from a real-time digital visual media feed.

After segmenting an object in a digital image utilizing the static salient content neural network, the deep salient object segmentation system 110 also performs the act 316 of providing the segmented digital image for display on the mobile display 300. The deep salient object segmentation system 110 can provide the segmented digital image for display via a variety of graphical user interfaces on the mobile device (described in more detail in FIG. 4 below). Furthermore, in one or more embodiments, the mobile device 300 can cease to provide a segmented digital image for display 316 and return to capture a real-time digital visual media feed (e.g., return to the act 302 and perform the acts 302-316).

In one or more embodiments, after the mobile device 300 provides a segmented digital image for display 316, the deep salient object segmentation system 110 can perform the act 318 of modifying the segmented digital image. Specifically, the deep salient object segmentation system 110 can modify the segmented digital image 318 based on the object identified in the digital image. For example, the deep salient object segmentation system 110 can utilize the mobile device 300 to modify the brightness, color, contrast, size, or orientation of an object identified in the digital image. Similarly, the deep salient object segmentation system 110 can cut the object identified in the digital image and past the object into a second digital image.

Moreover, in one or more embodiments, the deep salient object segmentation system 110 can perform the act 320 of storing the modified digital image. In one or more embodiments, the deep salient object segmentation system 110 stores the modified digital image on the mobile device 300. The deep salient object segmentation system 110 can also store the modified digital image on a remote server (e.g., the server(s) 102).

The acts 302-320 described in relation to FIG. 3 are intended to be illustrative of an exemplary sequence of acts in accordance with the present disclosure, and are not intended to limit potential embodiments. Alternative embodiments can include additional, fewer, or different acts than those articulated in FIG. 3. For instance, in some embodiments, the acts 304 and 306 are combined into a single act (and/or the acts 312 and 314 are combined into a single act). Similarly, although not illustrated in FIG. 3, in one or more embodiments, the deep salient object segmentation system 110 can modify the segmented real-time digital visual media feed (similar to modifying the segmented digital image at the act 318). Furthermore, in one or more embodiments, the deep salient object segmentation system 110 can store the modified real-time digital visual media feed (similar to storing the modified digital image in the act 320). Specifically, in one or more embodiments, the modified real-time digital visual media feed can be stored as a video file.

Additionally, the acts described herein may be performed in a different order, may be repeated or performed in parallel with one another, or may be performed in parallel with different instances of the same or similar acts. For example, in one or more embodiments, the mobile device 300 can perform the acts 310-320 without performing the acts 302-308. Furthermore, in one or more embodiments, the deep salient object segmentation system 110 can perform the acts 302-308 without performing the acts 312-320. Moreover, in one or more embodiments, the deep salient object segmentation system 110 can perform the acts 302, 310, 314-320 without performing the acts 304-308.

In addition, in one or more embodiments, the deep salient object segmentation system 110 can apply a real-time salient content neural network and/or a static salient content neural network to digital visual media (e.g., a digital video and/or digital image) already stored in the mobile device 300. For example, in one or more embodiments, the deep salient object segmentation system 110 can detect user selection of a digital video on the mobile device 300, identify an object in the digital video (e.g., utilizing the real-time salient content neural network and/or the static salient content neural network), and modify the digital video based on the identified object. Similarly, the deep salient object segmentation system 110 can detect user selection of a digital image on the mobile device 330, identify an object in the digital image (e.g., utilizing the static salient content neural network), and modify the digital image based on the identified object. Furthermore, in one or more embodiments, the deep salient object segmentation system 110 can apply a real-time salient content neural network and/or a static salient content neural network to a video call on a mobile device 300. For example, in one or more embodiments, the deep salient object segmentation system 110 can detect a video call (i.e., a real-time digital visual media feed) on the mobile device 300, identify an object in the video call (e.g., utilizing the real-time salient content neural network and/or the static salient content neural network), and modify the video call based on the identified object.

As just mentioned, the deep salient object segmentation system 110 can utilize a real-time salient content neural network and a static salient content neural network to identify objects in digital visual media directly on a mobile device and present modified digital visual media for display via a user interface. For example, FIGS. 4A-4B illustrate a user interface for displaying modified digital visual media in accordance with one or more embodiments.

Specifically, FIG. 4A illustrates a mobile device 400 with a display 402 that includes a user interface 404. As shown in FIG. 4A, the user interface 404 includes a digital visual media display element 406. The digital visual media display element 406 can display digital video and/or digital images, including a real-time digital visual media feed. For example, in FIG. 4A, the digital visual media display element 406 illustrates a real-time digital visual media feed 412 captured by a camera affixed to the mobile device 400.

In addition, as illustrated in FIG. 4A, the deep salient object segmentation system 110 also includes selectable elements 408a (for identifying and/or modifying objects in digital visual media), 408b (for accessing digital visual media stored on the mobile device 300 and/or a remote server), 408c (for modifying a camera flush), and 408d (for modifying a camera utilized to capture digital visual media, e.g., between a front and back facing camera). The user interface 404 also includes a capture element 410 (e.g., for storing and/or saving digital visual media, such as a digital video or digital image).

Based on user interaction with the selectable element 408a, the deep salient object segmentation system 110 can provide additional options for identifying and/or modifying objects in digital visual media. For example, FIG. 4B illustrates the user interface 404 upon selection of the selectable element 408a. As shown, the user interface 404 includes a plurality of modification elements 414a-414f. Upon selection of one or more of the modification elements 414a-414f, the deep salient object segmentation system 110 can provide other, more detailed options for modifying a digital visual media item. For example, upon selection of the modification element 414c, the deep salient object segmentation system 110 can provide specific modification options for modifying background pixels to look like a particular place (e.g., different selectable options for changing background pixels to look like a beach, a sports stadium, or a school).

Upon selection of one of the modification elements 414a-414f (or other more specific modification options) the deep salient object segmentation system 110 can identify an object within a digital visual media item and modify the digital visual media item. To illustrate, upon selection of the selectable element 414f (entitled "Outline"), the deep salient object segmentation system 110 can identify a salient object portrayed in the real-time digital visual media feed 412 and modify the digital visual media feed 412 to affix an outline to the identified object.

For example, FIG. 4C illustrates the user interface 404 displaying a real-time digital visual media feed 412 in three views 416a-416c, with an outline surrounding an individual portrayed in the real-time digital visual media feed 412. As shown in FIG. 4C, the deep salient object segmentation system 110 applies a real-time salient content neural network 418 to identify the person portrayed in the real-time digital visual media feed 412. Moreover, the deep salient object segmentation system 110 modifies the real-time digital visual media feed 412 to provide an outline (i.e., a dashed boundary line) around the identified person.

Moreover, the views 416b and 416c illustrate the deep salient object segmentation system 110 providing the outline in the real-time digital visual media feed 412 over time (e.g., as the camera affixed to the mobile device 400 continues to capture digital visual media). The person captured by the camera feed in the mobile device 400 changes positions through the views 416a-416c. In each frame of the views 416a-416c, the deep salient object segmentation system 110 selects the moving person that is captured by the camera feed. In particular, the deep salient object segmentation system 110 continuously captures the real-time digital visual media feed 412, applies a real-time salient content neural network to the digital visual media feed to identify the person in the real-time digital visual media feed 412, modifies the real-time digital visual media feed 412, and provides the modified real-time digital visual media feed for display.

As mentioned above, the deep salient object segmentation system 110 can also capture a static digital image and apply a second salient content neural network to the static digital image. For example, in relation to FIG. 4C, the deep salient object segmentation system 110 can detect user interaction with the capture element 410. In response, the deep salient object segmentation system 110 can capture a digital image from the real-time digital visual media feed 412 and apply a second salient content neural network to the digital image.

Indeed, FIG. 4D illustrates a digital image 422 captured by the deep salient object segmentation system 110 (i.e., in response to user interaction with the capture element 410). As illustrated in FIG. 4D, the deep salient object segmentation system 110 applies the static salient content neural network 420 to the digital image 422. By applying the static salient content neural network 420, the deep salient object segmentation system 110 can more particularly identify the object in the digital image 422 (e.g., refine the initial identification from the real-time salient content neural network 418).

In addition, as shown in FIG. 4D, the deep salient object segmentation system 110 also modifies the digital image 422. In particular, the deep salient object segmentation system 110 applies the outline to the identified person in the digital image and provides the modified digital image for display.

Although FIGS. 4C-4D illustrates the deep salient object segmentation system 110 modifying digital visual media by applying an outline of an object, the deep salient object segmentation system 110 can apply a variety of different modifications to digital videos and/or digital images. Indeed, rather than a dashed boundary line to indicate an identified object, the deep salient object segmentation system 110 can modify a digital visual media item (e.g., modifying an identified object and/or background pixels) by applying a filter; applying an overlay; modifying color, brightness, or hue; or replacing pixels (e.g., replacing an identified object or background pixels). For instance, the deep salient object segmentation system 110 can modify digital visual media based on user interaction with the modification elements 414a-414f (or other more specific modification options). Alternatively, in one or more embodiments, the deep salient object segmentation system 110 can automatically apply a modification to digital visual media.

In one or more embodiments, the deep salient object segmentation system 110 can provide options in the user interface 404 to store both a modified real-time digital visual media feed of views 416a-416c and a modified digital image of view 416d (as described in FIG. 3). Moreover, in one or more embodiments, the deep salient object segmentation system 110 can utilize the user interface 404 to display (and modify) a digital video and/or digital image stored on the mobile device 400.

As discussed above, the deep salient object segmentation system 110 can access a trained object classification neural network and utilize the trained object classification neural network to train a salient content neural network. In particular, the deep salient object segmentation system 110 can utilize one or more classification channels (e.g., an object classification channel) from a trained object classification neural network to train a salient content neural network. For example, FIG. 5 illustrates identifying a foreground channel 504 and background channel 506 from a trained object classification neural network 502 and utilizing the foreground channel 504 and the background channel 506 to identify initialization parameters 508 for training a salient content neural network 512.

Figure 5:
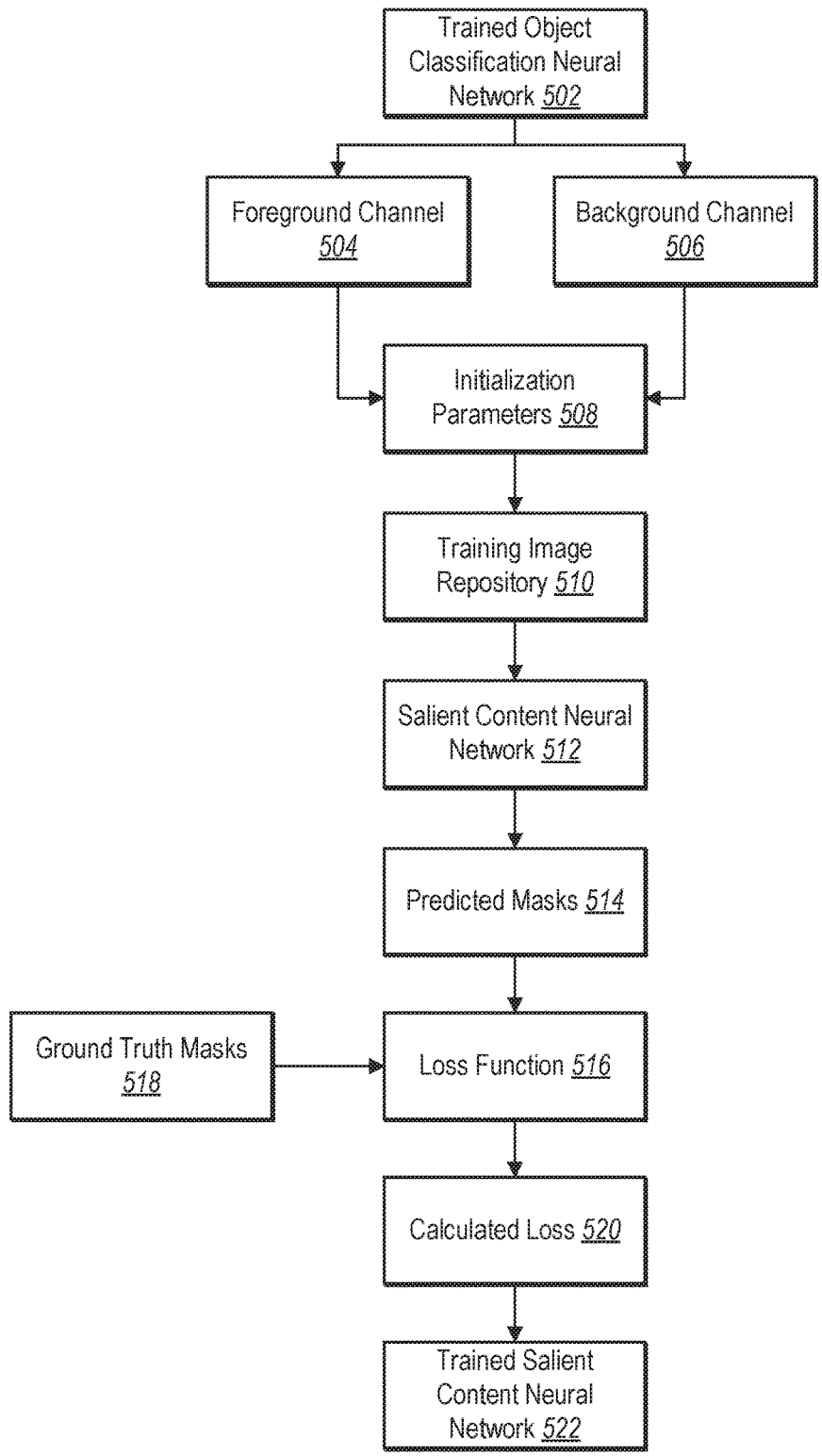
FIG. 5 illustrates a flow chart of training a salient content neural network based on channels from a trained object classification neural network in accordance with one or more embodiments.

As shown in FIG. 5, the deep salient object segmentation system 110 accesses the trained object classification neural network 502. The deep salient object segmentation system 110 can utilize a variety of different object classification neural networks (e.g., neural networks that utilize semantic segmentation). In one or more embodiments, the object classification neural network includes the art model for semantic segmentation DeepLabv2-ResNet101 ("DeepLab neural network") as described in L. C. Chen, G. Papandreou, I. Kokkinos, K. Murphy, and A. L. Yuille, Semantic image segmentation with deep convolutional nets and fully connected CRFs, Computer Research Repository 1412.7062 (2015).

Moreover, in one or more embodiments, the deep salient object segmentation system 110 generates the trained object classification neural network 502. For example, the deep salient object segmentation system 110 can generate the trained object classification neural network 502 utilizing a repository of digital training images with corresponding classification labels and ground truth masks. Specifically, the deep salient object segmentation system 110 can utilize an (untrained) object classification neural network to predict classifications and masks from the digital training images and compare the predicted classifications and masks with the classification labels and ground truth masks. The deep salient object segmentation system 110 can then generate the trained object classification neural network 502 by refining parameters based on the comparison (e.g., to minimize a loss function).

As mentioned above, the trained object classification neural network 502 can include a plurality of object classification channels (i.e., output channels for classifying objects via the trained object classification neural network 502). Specifically, in one or more embodiments, the trained object classification neural network 502 can include classification channels corresponding to the 20 Pascal VOC classes (and a classification channel for background pixels). Accordingly, in one or more embodiments, the trained object classification neural network utilizes 21 object classification channels. In other embodiments, the trained object classification neural network utilizes a different number of classification channels (e.g., 80 channels).

Moreover, in one or more embodiments, a trained object classification channel can be larger (in memory) than the real-time salient content neural network and/or the static salient content neural network. In particular, the DeepLab neural network is approximately 500 M in size and cannot be easily deployed on mobile devices due to limits in memory and processing power. However, the deep salient object segmentation system 110 can utilize the DeepLab neural network to train salient content neural networks. Indeed, as shown in FIG. 5, the deep salient object segmentation system 110 utilizes the trained object classification neural network 502 to determine a foreground channel 504 and a background channel 506. Indeed, as just mentioned, in one or more embodiments, the trained object classification neural network 502 includes 21 object classification channels. The deep salient object segmentation system 110 can utilize one of the object classification channels (e.g., the person output channel) as the foreground channel 504. Moreover, the deep salient object segmentation system 110 can utilize a background classification channel as the background channel 506.

Furthermore, as shown in FIG. 5, the deep salient object segmentation system 110 can utilize the foreground channel 504 and the background channel 506 to identify initialization parameters 508. For example, the deep salient object segmentation system 110 can initialize the foreground weights of the salient content neural network 512 from the foreground channel 504. Similarly, the deep salient object segmentation system 110 can initialize the background weights of the salient content neural network 512 from the background channel 506.

To illustrate, researchers have found that initializing the foreground weights of the salient content neural network 512 based on the person object classification channel of the trained object classification neural network 502 and/or initializing the background weights of the salient content neural network 512 based on the background classification channel of the trained object classification neural network 502 can make training significantly faster and generate results that are more accurate.

Although the foregoing example discusses utilizing a person object classification channel from the trained object classification neural network 502, the foreground channel 504 can comprise any object classification channel from the trained object classification neural network 502. Regardless of the type of object classification channel utilized to generate the initialization parameters 508, the deep salient object segmentation system 110 is capable of training the salient content neural network 512 to identify any salient object in digital visual media.

Indeed, FIG. 5 illustrates utilizing the initialization parameters 508 and digital training images from a training image repository 510 in order to generate the trained salient content neural network 522. In particular (similar to the process described in FIG. 2), the deep salient object segmentation system 110 utilizes the salient content neural network 512 (with the initialization parameters 508) to generate predicted masks 514 from the digital training images. Moreover, as shown in FIG. 5, the deep salient object segmentation system 110 utilizes a loss function 516 to compare the predicted masks 514 with the ground truth masks 518 of the digital training images. The loss function 516 generates a calculated loss 520 based on the comparison between the predicted masks 514 and the ground truth masks 518. The deep salient object segmentation system 110 can then iteratively adjust the parameters of the salient content neural network 512 based on the calculated loss 520 (e.g., to minimize the calculated loss 520).

Although FIG. 5 illustrates utilizing both the foreground channel 504 and the background channel 506, in one or more embodiments, the deep salient object segmentation system 110 can identify the initialization parameters 508 from the foreground channel 504 without the background channel 506. Furthermore, in one or more embodiments, the deep salient object segmentation system 110 can identify initialization parameters 508 from the background channel 506 without the foreground channel 504.

Moreover, although FIG. 5 illustrates utilizing a trained object classification neural network 502, the deep salient object segmentation system 110 can pre-train any neural network on image classification tasks. Pre-training neural networks (e.g., salient content neural networks) using image classification tasks helps boost the performance of a neural network. In particular, a neural network can be pre-trained using image classification prior to being trained as a salient content neural network (as described in FIG. 2). In one or more embodiments, the neural networks are pre-trained on the image classification tasks utilizing the ImageNet dataset and the MS COCO image segmentation dataset.

As mentioned above, the deep salient object segmentation system 110 can also determine other optimization parameters for training a salient content neural network (in addition to the initialization parameters 508 in FIG. 5). Specifically, in one or more embodiments, the deep salient object segmentation system 110 performs net surgery to identify a variety of optimization parameters from a salient content neural network. For example, FIG. 6 illustrates a deep salient object segmentation system 110 that utilizes an optimization salient content neural network 602 to generate and provide optimization parameters 604 to train subsequent salient content neural networks.

The optimization salient content neural network 602 can include any neural network for performing net surgery. For example, in one or more embodiments, the optimization salient content neural network 602 comprises the DeepLab neural network modified to predict only foreground and background classification channels.

Figure 6:
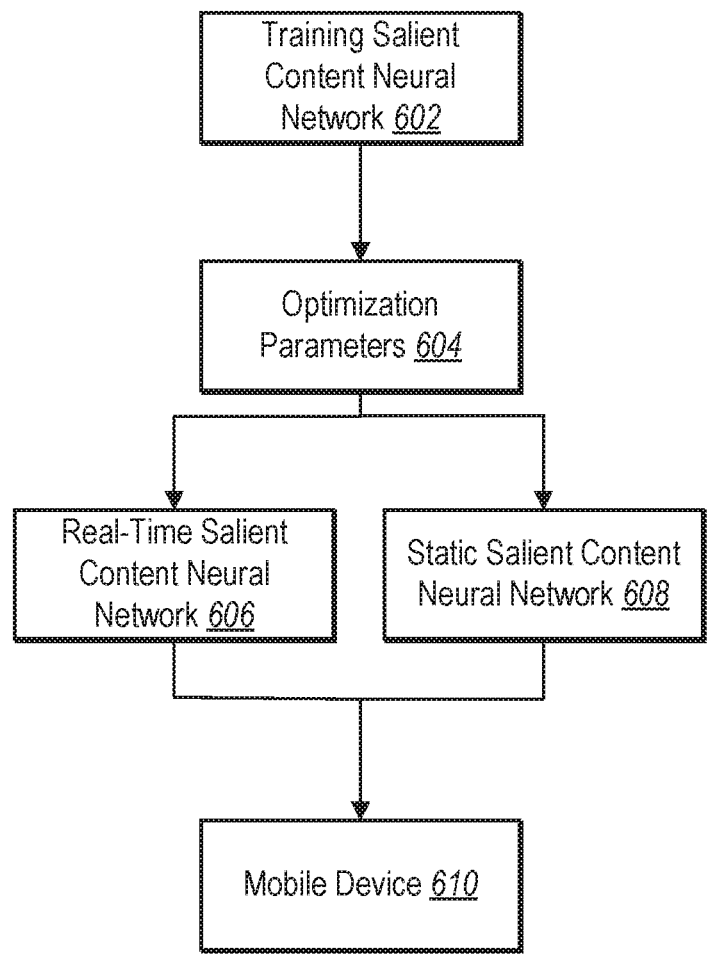
FIG. 6 illustrates a flow chart of training one or more salient content neural networks for operation on a mobile device based on optimization parameters from an optimization salient content neural network in accordance with one or more embodiments.

In FIG. 6, the deep salient object segmentation system 110 utilizes an optimization salient content neural network 602 to determine a set of optimization parameters 604. Specifically, the deep salient object segmentation system 110 can modify various parameters, such as weight decay parameters and/or iteration parameters to determine which parameters improve the speed and/or accuracy of the optimization salient content neural network 602.

Additionally, as shown in FIG. 6, the deep salient object segmentation system 110 utilizes the optimization parameters 604 from the optimization salient content neural network 602 in the real-time salient content neural network 606 and the static salient content neural network 608. The deep salient object segmentation system 110 can then train the real-time salient content neural network 606 (e.g., in accordance with FIG. 2). Furthermore, the deep salient object segmentation system 110 can train the static salient content neural network 608 (e.g., in accordance with FIG. 2).

Furthermore, the deep salient object segmentation system 110 provides the real-time salient content neural network 606 and the static salient content neural network to the mobile device 610. Indeed, as described above, the mobile device 610 can utilize the real-time salient content neural network 606 and/or the static salient content neural network 608 to segment objects from digital visual media.

In one or more embodiments, the deep salient object segmentation system 110 can utilize the optimization parameters 604 in training the real-time salient content neural network 606 without utilizing the optimization parameters 604 in training the static salient content neural network 608. Furthermore, in one or more embodiments, the deep salient object segmentation system 110 can utilize the optimization parameters 604 in training the static salient content neural network 608 without utilizing the optimization parameters 604 in training the real-time salient content neural network 606. Moreover, in one or more embodiments, the optimization salient content neural network 602 can be larger (in memory) than the real-time salient content neural network 606 and the static salient content neural network 608.

Results of experimentation indicate that the deep salient object segmentation system can accurately identify salient objects in digital visual media with more accuracy directly compared to some conventional systems. Indeed, as illustrated in Table 1, on average, an embodiment of the deep salient object segmentation system utilizing a real-time salient content neural network (DenseNet, with a size of 7 M) and a static salient content neural network (GoogLeNet, with a size of 40 M) resulted in an IoU accuracy of 88.52% and 89.58% respectively compared to the DeepLabv2ResNet-101 IoU average accuracy of 87.56%. The three models were trained using the same hyper-parameters and a batch size of 1. Furthermore, the experimental results used 20000, 60000, 80000 iterations for the three models, which is roughly 4 epochs. The experimental results use a dense CRF to improve the segmentation quality.

TABLE 1

| Method | Real-time Salient Content Neural Network | Static Salient Content Neural Network | DeepLab |
| --- | --- | --- | --- |
| COCO-person | 85.68% | 89.2% | 87.8% |
| Flickr-hp | 90.37% | 91.9% | 91.7% |
| Flickr-portrait | 96.22% | 96.1% | 96.2% |
| DUT-Omron | 84.22% | 83.2% | 76.4% |
| MSRA10K | 86.12% | 87.5% | 85.7% |

Figure 7:
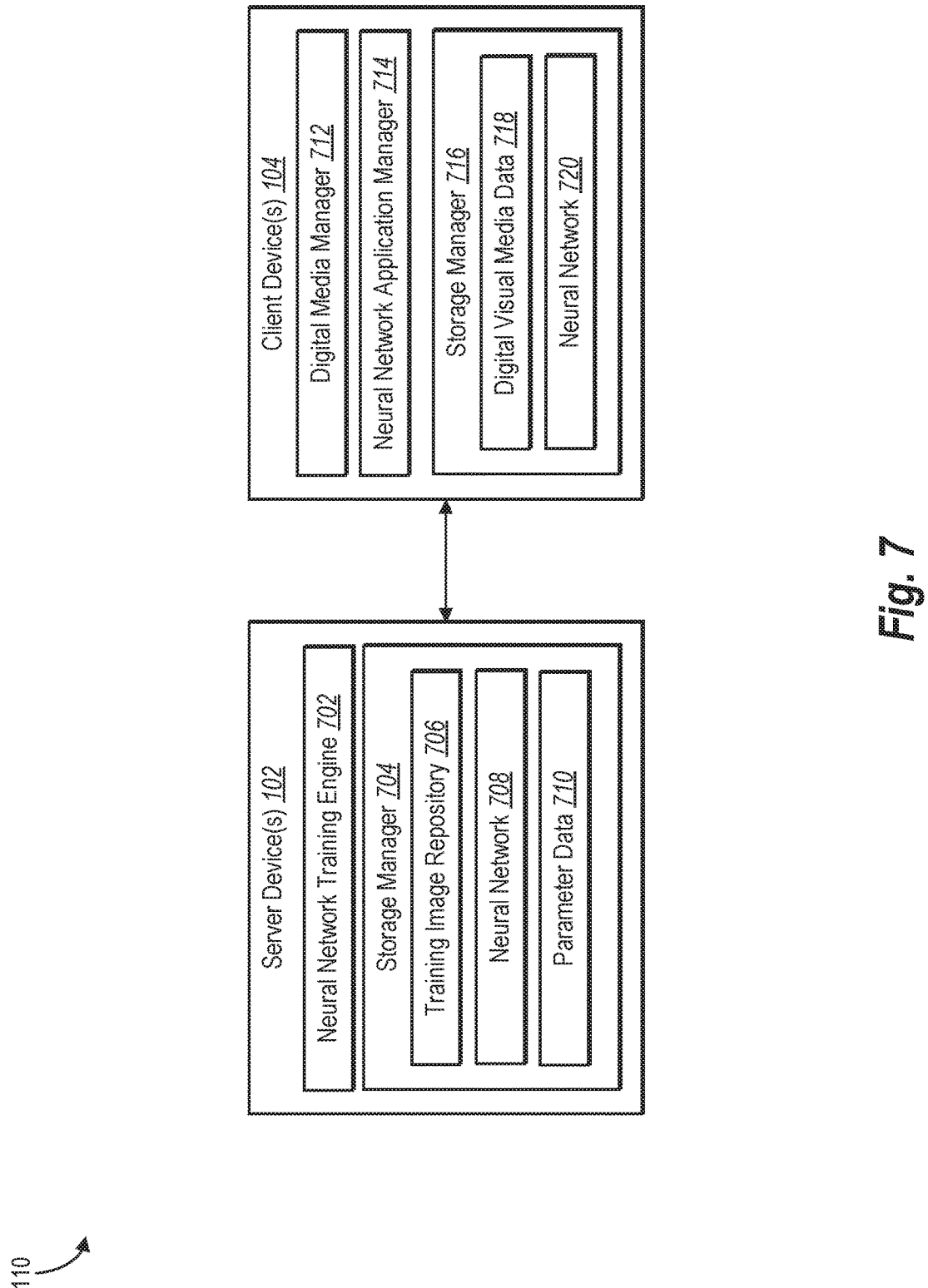
FIG. 7 illustrates a schematic diagram of a deep salient object segmentation system in accordance with one or more embodiments.

Turning now to FIG. 7, additional detail will be provided regarding components and capabilities of one example architecture of the deep salient object segmentation system 110. As shown in FIG. 7, the deep salient object segmentation system 110 may be implemented on the server device(s) 102 and the client device(s) 104. In particular, the server device(s) 102 can implement the deep salient object segmentation system 110 with a neural network training engine 702 and a storage manager 704 (that includes a training image repository 706, a neural network 708, and parameter data 710). Furthermore, the client device 104a can implement the deep salient object segmentation system 110 with a digital media manager 712, a neural network application manager 714, and a storage manager 716 (that includes digital visual media data 718 and a neural network 720). Alternatively, in one or more embodiments, the elements mentioned above can all be within the server device 102 or the client device 104a. Furthermore, the elements illustrated in FIG. 7 can be interchanged between the server device(s) 102 and the client device 104a.

As just mentioned, and as illustrated in FIG. 7, the deep salient object segmentation system 110 (implemented via the server device(s) 102) includes the neural network training engine 702. The neural network training engine 702 can teach, guide, tune, and/or train one or more neural networks.

In particular, the neural network training engine 702 can train a salient content neural network based on a plurality of digital training images (e.g., images from the training image repository 706). More specifically, the neural network training engine 702 can access, identify, generate, create, and/or determine training input and utilize the training input to train a neural network.

The neural network training engine 702 can train any type or variety of neural network (e.g., a variety of machine learning algorithms). As discussed above, in one or more embodiments, the neural network training engine 702 trains a deep convolutional neural network (CNN) and/or fully convolutional neural network (FCN) to select salient objects in the foreground of digital images. Moreover, the neural network training engine 702 can train a real-time salient object neural network, a static salient object neural network, an object classification neural network, and/or an optimization salient content neural network (as described above).

The neural network training engine 702 can generate or access a variety of types of training input. As described above, in one or more embodiments, the neural network training engine 702 trains a neural network based on digital images and ground truth masks (from the training image repository 706). Moreover, in one or more embodiments, the neural network training engine 702 trains a neural network based on one or more foreground channel parameters or one or more background channel parameters (e.g., from the parameter data 710). Indeed, as mentioned above, the neural network training engine 702 can utilize a person channel and a background channel from a trained object classification neural network as initialization parameters for training a salient content neural network. Similarly, the neural network training engine 702 can train a salient content neural network based on the parameter data 710.

In one or more embodiments, the neural network training engine 702 generates, determines, and/or identifies the parameter data 710. For instance, the neural network training engine 702 can perform net surgery to determine optimization parameters to utilize in training a salient content neural network. As mentioned, the neural network training engine 702, in one or more embodiments, can train a neural network and provide the neural network to the storage manager 704 (e.g., the neural network 708).

As illustrated in FIG. 7, the deep salient object segmentation system 110 also includes the storage manager 704. The storage manager 704 maintains data for the deep salient object segmentation system 110. The storage manager 704 can maintain data of any type, size, or kind as necessary to perform the functions of the deep salient object segmentation system 110. The storage manager 704, as shown in FIG. 7, includes the training image repository 706, the neural network 708, and the parameter data 710.

The training image repository 706 can include a plurality of training digital visual media. In particular, in one or more embodiments, the training image repository 706 includes digital training images utilized by the neural network training engine 702 to train one or more neural networks. The training image repository 706 can include any type or variety of digital visual media.

In addition to digital visual media, the training image repository 706 can also include training object data. For example, the training image repository 706 includes training object data with regard to target salient objects. Specifically, the training image repository 706 can include ground truth masks (e.g., salient object boundaries) corresponding to target salient objects within digital training images.

Furthermore, the neural network 708 can include a plurality of neural networks. In particular, in one or more embodiments, neural network 708 includes neural networks that are generated by the neural network training engine 702. In one or more embodiments, the neural network 708 can be utilized by the neural network application manager 714. The neural network 708 can include any kind of neural network. Specifically, in one or more embodiments, the neural network 708 can include a real-time salient content neural network, a static salient content neural network, an object classification neural network, and/or an optimization salient content neural network. In one or more embodiments, the neural network application manager 714 can be applied to both a real-time visual media feed and to static digital visual media.

The parameter data 710 can include a plurality of parameters. In particular, in one or more embodiments, parameter data 710 includes parameters that are utilized by the neural network training engine 702. The parameter data 710 can include any kind of data for the neural network training engine 702. Specifically, in one or more embodiments, the parameter data 710 includes the optimization parameters (e.g., initialization parameters, weight decay parameters, and/or iteration parameters).

As mentioned above, and as illustrated in FIG. 7, the client device 104a includes the digital media manager 712. The digital media manager 712 can access, identify, modify, revise, and/or provide digital visual media. Furthermore, the digital media manager 712 can receive selection information identifying a salient object (e.g., from the neural network application manager 714) and modify the digital visual media (e.g., modify the salient object foreground pixels and/or background pixels).

In particular, the digital media manager 712 can modify digital visual media or a portion of a digital visual media. For example, in one or more embodiments, the digital media manager 712 alters color, brightness, hue, or any other visual characteristic of a target salient object (or background). Similarly, the digital media manager 712 can move, resize, rotate, or orient a target salient object portrayed in digital visual media. Similarly, the digital media manager 712 can isolate, cut, and paste a target salient object portrayed in digital visual media. Moreover, the digital media manager 712 can delete or remove a salient object (or background) in digital visual media.

The digital media manager 712 can also apply one or more filters or styles to digital visual media. More specifically, the digital media manager 712 can independently apply one or more filters or styles to a salient object in the digital visual media. Thus, for example, the digital media manager 712 can apply a first filter to a salient object and apply a second filter to background pixels in digital visual media.

As illustrated in FIG. 7, the deep salient object segmentation system 110 also includes the neural network application manager 714. The neural network application manager 714 can access, utilize, or apply a trained neural network (e.g., apply a trained neural network from the neural network training engine 702). For instance, the neural network application manager 714 applies a trained neural network to digital visual media and selects an object portrayed in the digital visual media.

The neural network application manager 714 utilizes any trained neural network. For example, in one or more embodiments, the neural network application manager 714 utilizes a trained neural network generated by the neural network training engine 702. Thus, in one or more embodiments, the neural network application manager 714 utilizes a fully convolutional neural network to generate information that enables selection of a salient object in digital visual media. Specifically, in one or more embodiments, the neural network application manager 714 utilizes a real-time salient content neural network and/or a static salient content neural network to segment a salient object in digital visual media. Moreover, the neural network application manager 714 can apply a real-time salient content neural network (e.g., to a real-time digital visual media feed) and/or a static salient content neural network (e.g., to a digital image).

Furthermore, the neural network application manager 714 can generate a variety of outputs. For example, the neural network application manager 714 generates a set of pixels representing a salient object in the foreground of digital visual media (i.e., an output mask).

Moreover, as illustrated in FIG. 7, the deep salient object segmentation system 110 also includes the storage manager 716. The storage manager 716 maintains data for the deep salient object segmentation system 110. The storage manager 716 can maintain data of any type, size, or kind as necessary to perform the functions of the deep salient object segmentation system 110. The storage manager 716, as shown in FIG. 7, includes the digital visual media data 718 and the neural network 720.

Digital visual media data 718 can include information for any digital visual media utilized by the deep salient object segmentation system 110. For example, digital visual media data 718 includes a digital video or digital image (e.g., where the user seeks to select an object portrayed in the foreground of digital visual media). Digital visual media data 718 can also include information generated by the deep salient object segmentation system 110 regarding digital visual media. For instance, digital visual media data 718 includes a mask for an identified object in digital visual media.

Furthermore, the neural network 720 can include a plurality of neural networks. In particular, in one or more embodiments, neural network 720 includes neural networks that are generated by the neural network training engine 702. In one or more embodiments, the neural network 720 can be utilized by the neural network application manager 714. The neural network 720 can include any kind of neural network. Specifically, in one or more embodiments, the neural network 720 can include a real-time salient content neural network and/or a static salient content neural network.

Each of the components 702-720 of the deep salient object segmentation system 110 and their corresponding elements (as shown in FIG. 7) may be in communication with one another using any suitable communication technologies. It will be recognized that although components 702-720 and their corresponding elements are shown to be separate in FIG. 7, any of components 702-720 and their corresponding elements may be combined into fewer components, such as into a single facility or module, divided into more components, or configured into different components as may serve a particular embodiment.

The components 702-720 and their corresponding elements can comprise software, hardware, or both. For example, the components 702-720 and their corresponding elements can comprise one or more instructions stored on a computer-readable storage medium and executable by processors of one or more computing devices. When executed by the one or more processors, the computer-executable instructions of the deep salient object segmentation system 110 can cause a client device and/or a server device to perform the methods described herein. Alternatively, the components 702-720 and their corresponding elements can comprise hardware, such as a special purpose processing device to perform a certain function or group of functions. Additionally, the components 702-720 and their corresponding elements can comprise a combination of computer-executable instructions and hardware.

Furthermore, the components 702-720 of the deep salient object segmentation system 110 may, for example, be implemented as one or more stand-alone applications, as one or more modules of an application, as one or more plug-ins, as one or more library functions or functions that may be called by other applications, and/or as a cloud-computing model. Thus, the components 702-720 of the deep salient object segmentation system 110 may be implemented as a stand-alone application, such as a desktop or mobile application. Furthermore, the components 702-720 of the deep salient object segmentation system 110 may be implemented as one or more web-based applications hosted on a remote server. Alternatively or additionally, the components of the deep salient object segmentation system 110 may be implemented in a suit of mobile device applications or "apps." To illustrate, the components of the deep salient object segmentation system 110 may be implemented in a digital image editing application (or digital image capturing application), including but not limited to ADOBE PHOTOSHOP, ADOBE LIGHTROOM, or ADOBE PREMIERE. "ADOBE," "PHOTOSHOP," "LIGHTROOM," and "PREMIERE" are either registered trademarks or trademarks of Adobe Systems Incorporated in the United States and/or other countries.

Figure 8:
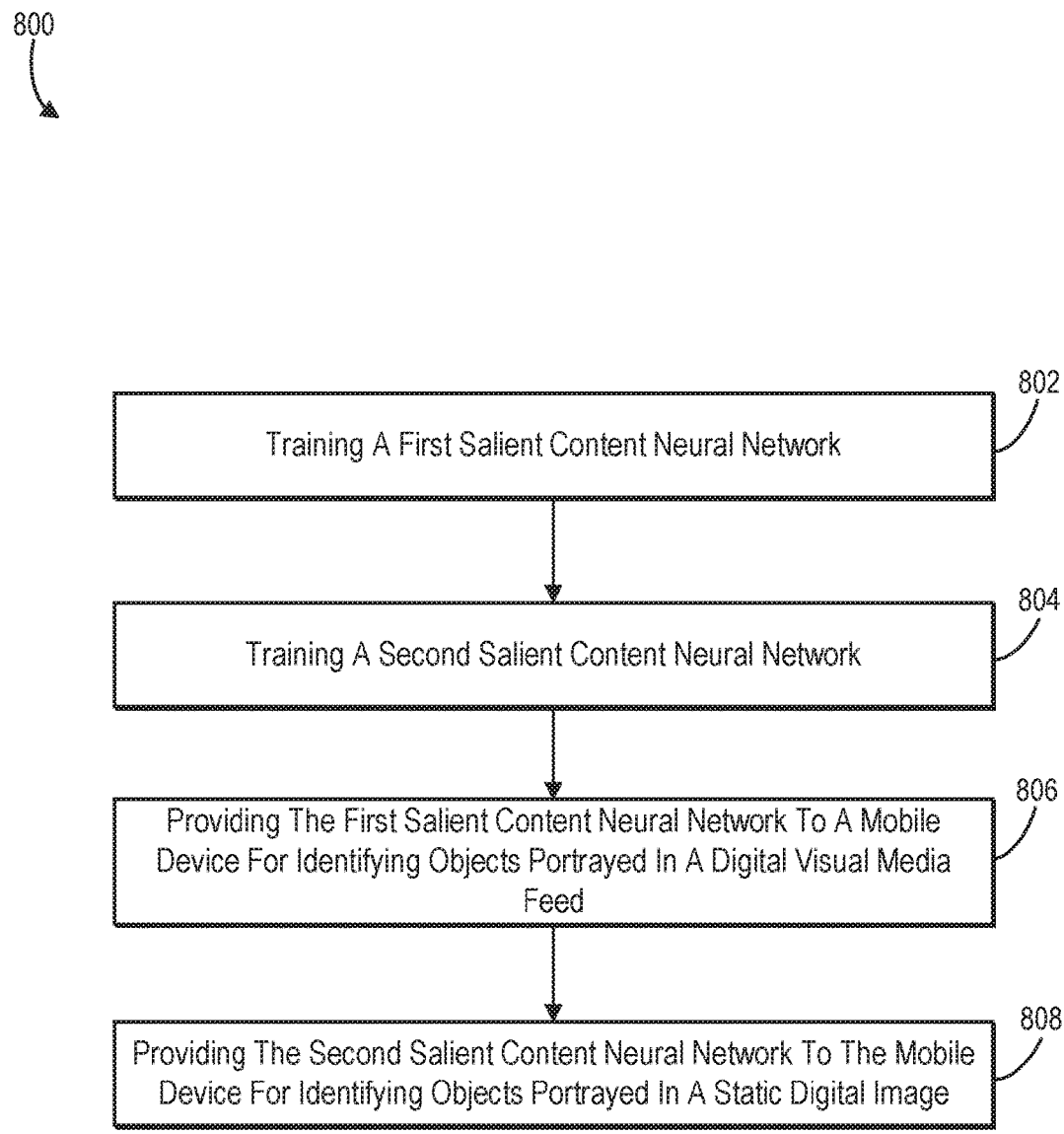
FIG. 8 illustrates a flowchart of a series of acts for training a salient content neural network to select objects in digital visual media in accordance with one or more embodiments.

FIGS. 1-7, the corresponding text, and the examples, provide a number of different systems and devices that allows a user to facilitate selection of salient objects within the foreground of digital visual media directly on mobile devices. In addition to the foregoing, embodiments can also be described in terms of a series of acts for accomplishing a particular result. For example, FIG. 8 illustrates a flowchart of a series of acts 800 for training a salient content neural network to select objects in digital visual media in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As illustrated in FIG. 8, the series of acts 800 includes an act 802 of training a first salient content neural network. In particular, the act 802 can include training a first salient content neural network by utilizing the first salient content neural network to generate predicted foreground pixels of a first training digital image and comparing ground truth foreground pixels of the first training digital image with the predicted foreground pixels of the first training digital image.

In addition, the act 802 can also include utilizing optimization parameters. For example, in one or more embodiments, the act 802 includes training a third salient content neural network utilizing a third training digital image and utilizing the optimization parameters of the third salient content neural network to train the first salient content neural network. The optimization parameters of the third salient content neural network can comprise a weight decay parameter, an initialization parameter, and/or an iterations parameter. Furthermore, the second salient content neural network can have a faster processing speed than the first salient content neural network.

In addition, the act 802 can include accessing a trained object classification neural network having at least one object classification channel and a background classification channel and training the first salient content neural network by utilizing the at least one object classification channel and the background classification channel as initialization parameters for the first salient content neural network. Furthermore, the object classification channel can comprise a person classification channel. The act 802 can also include training the first salient content neural network by: initializing foreground weights of the first salient content neural network from the person classification channel of the trained object classification neural network and initializing background weights of the first salient content neural network from the background classification channel of the trained object classification neural network.

As illustrated in FIG. 8, the series of act 800 include an act 804 of training a second salient content neural network. In particular, the act 804 can include training a second salient content neural network by utilizing the second salient content neural network to generate predicted foreground pixels of a second training digital image and comparing ground truth foreground pixels of the second training digital image with the predicted foreground pixels of the second training digital image.

In addition, the act 804 can also include utilizing optimization parameters. For example, in one or more embodiments, the act 804 includes training a third salient content neural network utilizing a third training digital image and utilizing the optimization parameters of the third salient content neural network to train the second salient content neural network. In particular, in one or more embodiments, the optimization parameters can comprise a weight decay parameter, an initialization parameter, and/or an iterations parameter.

Furthermore, the act 804 can include accessing a trained object classification neural network having at least one object classification channel and a background classification channel and training the second salient content neural network by utilizing the at least one object classification channel and the background classification channel as initialization parameters for the second salient content neural network. The object classification channel can include a person classification channel. The act 804 can also include training the second salient content neural network by: initializing foreground weights of the second salient content neural network from the person classification channel of the trained object classification neural network and initializing background weights of the second salient content neural network from the background classification channel of the trained object classification neural network.

As illustrated in FIG. 8, the series of acts 800 include an act 806 of providing a first salient content neural network to a mobile device. In particular, the act 806 can also include providing the first salient content neural network to a mobile device for identifying one or more salient objects portrayed in a digital visual media feed. Alternatively, in one or more embodiments, the act 806 can provide the first salient content neural network to a mobile device for identifying one or more salient objects portrayed in a static digital image.

Furthermore, as illustrated in FIG. 8, the series of acts 800 include an act 808 of providing a second salient content neural network to a mobile device. In particular, the act 808 can also include providing the second salient content neural network to the mobile device for identifying one or more salient objects portrayed in a static digital image. Alternatively, in one or more embodiments, the act 808 can provide the second salient content neural network to a mobile device for identifying one or more salient objects portrayed in a digital visual media feed.

Figure 9:
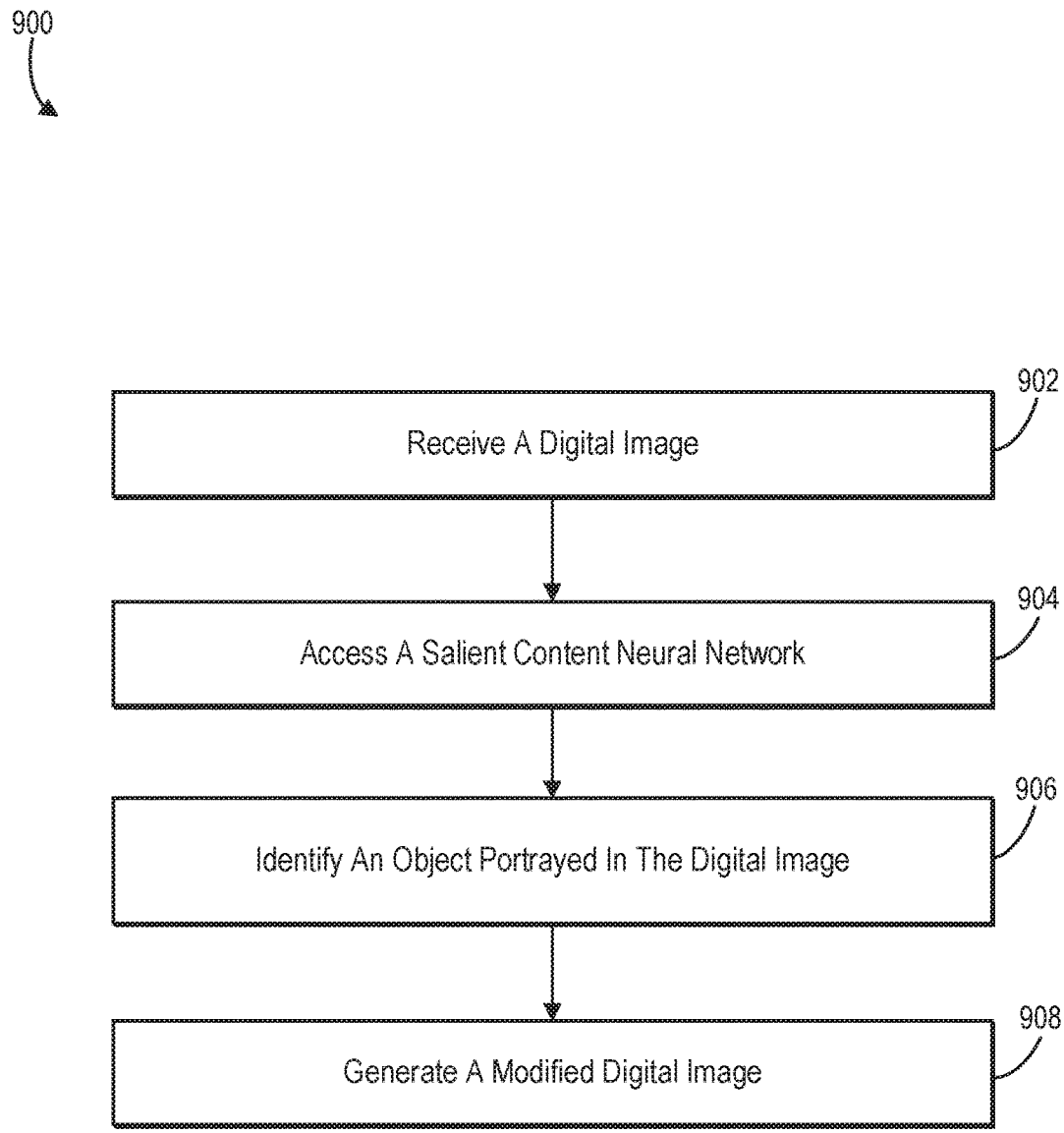
FIG. 9 illustrates a flowchart of a series of acts for segmenting a salient object within digital visual media in accordance with one or more embodiments.

Turning now to FIG. 9, additional detail will be provided regarding a flowchart of a series of acts 900 for utilizing a salient content neural network to select objects in digital visual media on mobile device in accordance with one or more embodiments. As illustrated in FIG. 9, the series of acts 900 includes an act 902 of receiving a digital image. In particular, the act 902 can include receiving, by a mobile device, a digital image portraying one or more salient objects. Additionally, the digital image of act 902 can include a digital image that is a part of a digital visual media feed. The act 902 can also include capturing the digital image from the digital visual media feed based on user interaction with the digital visual media feed.

As illustrated in FIG. 9, the series of acts 900 also includes an act 904 of accessing a salient content neural network. In particular, the act 904 can include accessing a salient content neural network on the mobile device, wherein the salient content neural network is trained by utilizing the salient content neural network to predict foreground pixels of a training digital image and comparing ground truth foreground pixels of the training digital image with the predicted foreground pixels of the training digital image. Additionally, the act 904 can include accessing a second salient content neural network on the mobile device, wherein the second salient content neural network is trained by utilizing the second salient content neural network to predict foreground pixels of a second training digital image and comparing ground truth foreground pixels of the second training digital image with the predicted foreground pixels of the second training digital image. In one or more embodiments, second salient content neural network can have a faster processing speed than the salient content neural network.

As illustrated in FIG. 9, the series of acts 900 can also include an act 906 of identifying the object portrayed in the digital image. In particular, the act 906 can include identifying, by the mobile device, one or more salient objects portrayed in the digital image by applying the salient content neural network to the digital image. Additionally, the act 906 can also include identifying the one or more salient objects portrayed in the digital image by applying the salient content neural network to the digital image from the digital visual media feed in response to capturing the digital image from the digital visual media feed. The act 906 can include applying the second salient content neural network to the digital visual media feed.

As illustrated in FIG. 9, the series of acts 900 can also include an act 908 of generating a modified digital image. In particular, the act 908 can include generating a modified digital image based on the identified one or more salient objects portrayed in the digital image. The act 908 can also include generating the modified digital image by: segregating background pixels of the digital image from the identified one or more salient objects portrayed in the digital image and modifying at least one of the background pixels of the digital image or the identified one or more salient objects. Additionally, the act 908 can include generating a modified digital visual media feed based on the identified one or more salient objects portrayed in the digital visual media feed. The act 908 can also include generating the modified digital visual media feed by: segregating background pixels of the digital visual media feed from the identified one or more salient object portrayed in the digital visual media feed and modifying at least one of the background pixels of the digital visual media feed or the identified one or more salient objects portrayed in the digital visual media feed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
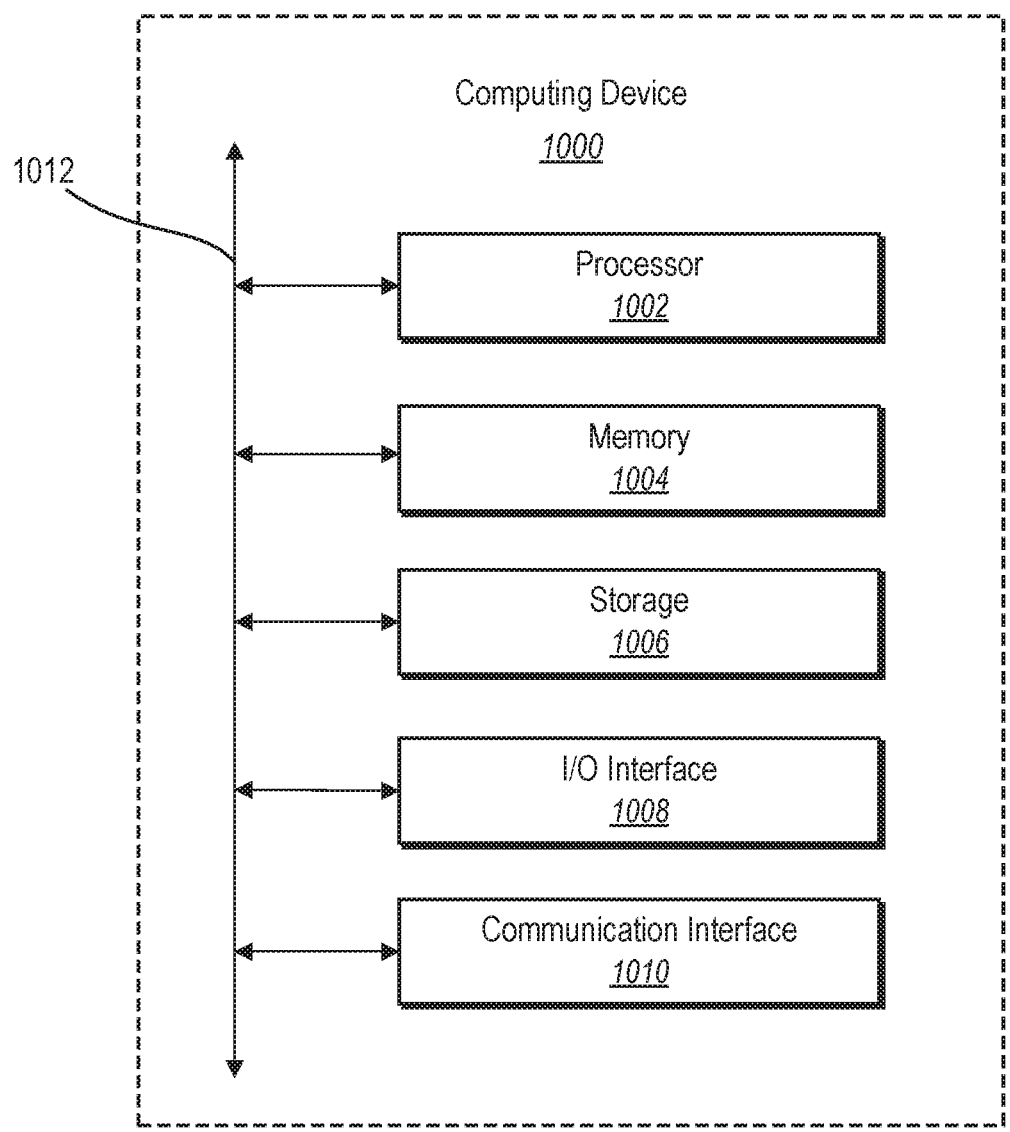
FIG. 10 illustrates a block diagram of an exemplary computing device in accordance with one or more embodiments.

FIG. 10 illustrates a block diagram of an exemplary computing device 1000 that may be configured to perform one or more of the processes described above. One will appreciate that one or more computing devices, such as the computing device 1000 may represent the computing devices described above (e.g., the server(s) 102, the client devices 104a-104n, the mobile device 300, and/or the mobile device 400). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computer system to:
    receive, by a mobile device, a digital image portraying one or more salient objects;
    select, by the mobile device, a neural network from a set of neural networks comprising a static salient content neural network and a real-time salient content neural network based on whether the digital image is static or is part of a real-time digital visual media feed;
    identify, by the mobile device, the one or more salient objects portrayed in the digital image by applying the selected neural network to the digital image; and
    generate a modified digital image based on the identified one or more salient objects portrayed in the digital image.

2. The non-transitory computer readable medium of claim 1, wherein the digital image is static and further comprising instructions that, when executed by the at least one processor, cause the computer system to:
    access the static salient content neural network on the mobile device; and apply the static salient content neural network to the digital image to identify the one or more salient objects portrayed in the digital image.

3. The non-transitory computer readable medium of claim 1, wherein the digital image is part of the real-time digital visual media feed and further comprising instructions that, when executed by the at least one processor, cause the computer system to:
   access the real-time salient content neural network on the mobile device; and
   apply the real-time salient content neural network to the real-time digital visual media feed to identify the one or more salient objects portrayed in the real-time digital visual media feed; and
   generate a modified digital visual media feed based on the identified one or more salient objects portrayed in the real-time digital visual media feed.

4. The non-transitory computer readable medium of claim 3, further comprising instructions that, when executed by the at least one processor, cause the computer system to generate the modified digital visual media feed by:
   segregating background pixels of the real-time digital visual media feed from the identified one or more salient objects portrayed in the real-time digital visual media feed; and
   modifying at least one of the background pixels of the real-time digital visual media feed or the identified one or more salient objects portrayed in the real-time digital visual media feed.

5. The non-transitory computer readable medium of claim 3, wherein the real-time salient content neural network has a faster processing speed than the static salient content neural network.

6. The non-transitory computer readable medium of claim 4, further comprising instructions that, when executed by at least one processor, cause the computer system to:
   capture the digital image from the real-time digital visual media feed;
   store the digital image on the mobile device; and
   identify the one or more salient objects portrayed in the digital image by applying the static salient content neural network to the digital image from the real-time digital visual media feed stored on the mobile device.

7. The non-transitory computer readable medium of claim 1, further comprising instructions that, when executed by the at least one processor, cause the computer system to generate the modified digital image by segregating background pixels of the digital image from the identified one or more salient objects portrayed in the digital image.

8. The non-transitory computer readable medium of claim 7, further comprising instructions that, when executed by the at least one processor, cause the computer system to generate the modified digital image by modifying at least one of the background pixels of the digital image or the identified one or more salient objects.

9. A system for training neural networks to identify objects within digital visual media, comprising:
   at least one processor; and
   at least one non-transitory computer readable storage medium storing instructions thereon, that, when executed by the at least one processor, cause the system to:
      train a real-time salient content neural network by utilizing the real-time salient content neural network to generate predicted foreground pixels of a first training digital image and comparing ground truth foreground pixels of the first training digital image with the predicted foreground pixels of the first training digital image;
      train a static salient content neural network by utilizing the static salient content neural network to generate predicted foreground pixels of a second training digital image and comparing ground truth foreground pixels of the second training digital image with the predicted foreground pixels of the second training digital image; and
      provide the real-time salient content neural network and the static salient content neural network to a mobile device for identifying one or more salient objects portrayed in a digital image, such that the real-time salient content neural network and the static salient content neural network are selectable on the mobile device based on whether the digital image is static or is part of a real-time digital visual media feed.

10. The system of claim 9, further comprising instructions that, when executed by the at least one processor, cause the system to:
   train an additional salient content neural network utilizing a third training digital image to determine optimization parameters; and
   utilize the optimization parameters of the additional salient content neural network to train the real-time salient content neural network and the static salient content neural network.

11. The system of claim 10, wherein the optimization parameters comprise at least one of: a weight decay parameter; an initialization parameter; and an iterations parameter.

12. The system of claim 9, wherein the real-time salient content neural network has a faster processing speed than the static salient content neural network.

13. The system of claim 9, further comprising instructions that, when executed by the at least one processor, cause the system to:
   access a trained object classification neural network having at least one object classification channel and a background classification channel; and
   train the real-time salient content neural network and the static salient content neural network by utilizing the at least one object classification channel and the background classification channel as initialization parameters for the real-time salient content neural network and the static salient content neural network.

14. The system of claim 13:
   wherein the at least one object classification channel comprises a person classification channel and further comprising instructions that, when executed by the at least one processor, cause the system to train the real-time salient content neural network by:
   initializing foreground weights of the real-time salient content neural network from the person classification channel of the trained object classification neural network; and
   initialize background weights of the real-time salient content neural network from the background classification channel of the trained object classification neural network.

15. In a digital medium environment for generating modified digital visual media, a computer-implemented method for training neural networks to identify objects within digital visual media, comprising:
   training a real-time salient content neural network by utilizing the real-time salient content neural network to generate predicted foreground pixels of a first training digital image and comparing ground truth foreground pixels of the first training digital image with the predicted foreground pixels of the first training digital image;

training a static salient content neural network having a slower processing speed than the real-time salient content neural network; and providing the real-time salient content neural network and the static salient content neural network to a mobile device for identifying one or more salient objects portrayed in a digital image, such that the real-time salient content neural network and the static salient content neural network are selectable on the mobile device based on whether the digital image is static or is part of a real-time digital visual media feed.

16. The method of claim 15, wherein training the static salient content neural network further comprises:

utilizing the static salient content neural network to generate predicted foreground pixels of a second training digital image and comparing ground truth foreground pixels of the second training digital image with predicted foreground pixels of the second training digital image.

17. The method of claim 15, further comprising:

training an additional salient content neural network utilizing a third training digital image; and utilizing optimization parameters of the additional salient content neural network to train the real-time salient content neural network and the static salient content neural network.

18. The method of claim 17, wherein the additional salient content neural network is larger than the real-time salient content neural network and the static salient content neural network.

19. The method of claim 17, wherein the optimization parameters comprise:

a weight decay parameter;

an initialization parameter; and an iterations parameter.

20. The method of claim 15, wherein training the first real-time salient content neural network comprises:

accessing a trained object classification neural network having at least one object classification channel and a background classification channel;

initializing foreground weights of the real-time salient content neural network from the at least one object classification channel; and initializing background weights of the real-time salient content neural network from the background classification channel.

* * * * *